(12) United States Patent
Onyeabor

(10) Patent No.: US 6,631,512 B1
(45) Date of Patent: Oct. 7, 2003

(54) METHOD AND SYSTEM FOR DATABASE-DRIVEN, SCALABLE WEB PAGE DEVELOPMENT, DEPLOYMENT-DOWNLOAD, AND EXECUTION

(76) Inventor: Gillis E Onyeabor, 2704 N. Karen Dr., Chandler, AZ (US) 85224

( * ) Notice: Subject to any disclaimer, the term of this patent is extended or adjusted under 35 U.S.C. 154(b) by 0 days.

(21) Appl. No.: 09/231,123

(22) Filed: Jan. 15, 1999

(51) Int. Cl.[7] .............................................. G06F 9/44
(52) U.S. Cl. ........................ 717/100; 709/311; 707/10
(58) Field of Search ................................ 709/310–320, 709/328–330; 707/1–10; 717/100–119

(56) References Cited

U.S. PATENT DOCUMENTS

| | | | |
|---|---|---|---|
| 5,742,768 A | | 4/1998 | Gennaro et al. ....... 295/200.33 |
| 5,933,142 A | * | 8/1999 | LaStrange et al. .......... 345/340 |
| 6,085,120 A | * | 7/2000 | Schwerdtfeger et al. ...... 700/90 |
| 6,225,995 B1 | * | 5/2001 | Jacobs et al. ............... 345/335 |
| 6,247,056 B1 | * | 6/2001 | Chou et al. .................. 709/229 |
| 6,529,910 B1 | * | 3/2003 | Fleskes ......................... 707/10 |

FOREIGN PATENT DOCUMENTS

| | | | |
|---|---|---|---|
| EP | 0880254 | 11/1998 | ........... H04L/29/06 |

OTHER PUBLICATIONS

Goodman, Danny, Danny Goodman's Javascript Handbook, IDG Books, 1996, pp. 44–47, 71–73, 397–410.*

Keeler et al., Netscape Virtuoso, MIS:Press, 1996, pp. 293–300.*

Emrys Visions Website Pages (www.emrys.com), Nov. 23, 1998 (22 pages).

Peter Coffee, "Step Aside Active X, Here Comes DNA", (www.zdnet.com) Jan. 1998.

Dobson, R., "Jump Starting your Site with Dynamic HTML—Active Content without Page Updates", *Web Techniques*, 2(12), pp. 35–41, (Dec. 1997).

* cited by examiner

Primary Examiner—St. John Courtenay III
(74) Attorney, Agent, or Firm—Parsons & Goltry; Robert A. Parsons; Michael W. Goltry

(57) ABSTRACT

A system and method for Web page development, deployment, download, and execution include and utilize a Web page development computer (110), a server computer (140), and a client computer (170). Development computer initializes (301) a page development tool which a developer uses to create a Web page document by placing components (320) on a Web page (220), whereupon the tool incorporates (324) executable code into the Web page document. Server computer stores the Web page document and, upon client computer request, retrieves (714) and sends (716) the Web page document to client computer. Client computer receives the Web page document and displays the corresponding Web page. If the Web page includes a database-related component, client computer requests (1030) data from server computer. After receiving (1032) the corresponding data, the data is displayed (1032) within the database-related component, and state variables are stored (1034) for later use.

1 Claim, 13 Drawing Sheets

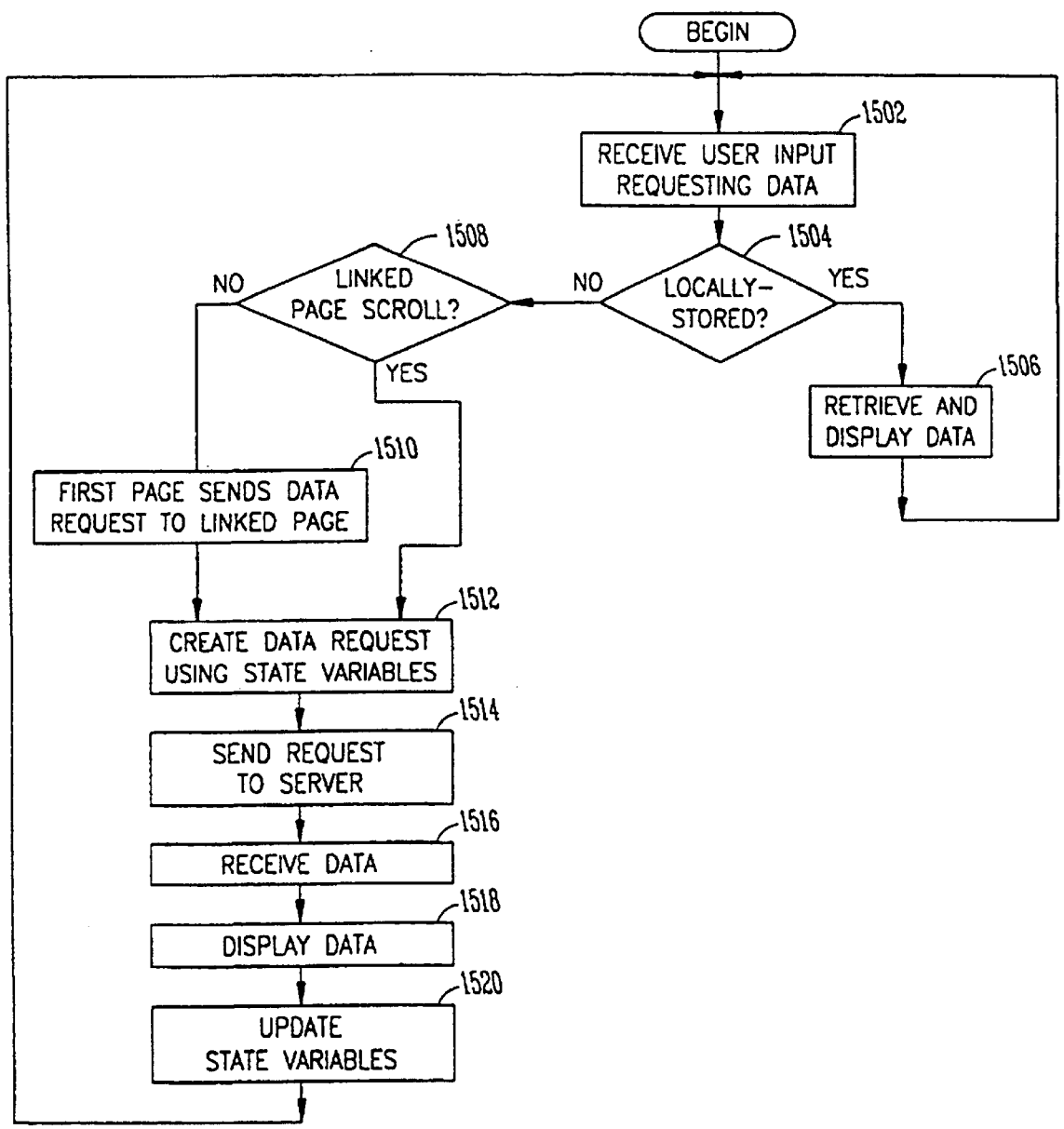

METHOD AND SYSTEM FOR DATABASE-DRIVEN, SCALABLE WEB PAGE DEVELOPMENT, DEPLOYMENT-DOWNLOAD, AND EXECUTION

FIELD OF THE INVENTION

The present invention relates generally to database access over the Internet and, more particularly, to Web page development, deployment, and execution conducive to database access and manipulation over the Internet.

BACKGROUND OF THE INVENTION

The World Wide Web, commonly referred to as the "Web," has become a valuable Internet resource for business, scientific, and personal research and promotion. Individuals and businesses alike create and post Web pages containing all types of information. The files defining such Web pages are typically stored on a "server" computer which is accessible to "client" computers via the Internet or some other network. Once associated with a server, a Web page can be accessed and viewed on a client computer using commercially-available Web browsers, such as Netscape Navigator and Microsoft Explorer.

As the Web has become more popular, Web pages have become more complex and businesses have asked Web page developers to provide more and more information display capabilities. One such capability, which has become a highly-desirable Web application, is the capability to remotely access and manipulate data. For example, a company may want its sales personnel to have Internet access to the company's databases while those sales personnel are in the field. As is described in detail below, prior art systems struggle with Internet database applications, specifically in the areas of efficiency, security, state management, and data "briefcasing."

As used herein, a "database" refers to a collection of information organized in tables and stored on a server computer or accessible to a server computer via a database manager. A "table" refers to a collection of data which organizes similar things together. For example, in a company database, one table might keep track of employee information and another table might keep track of sales activities. Every table contains columns and rows. For the purposes of this description, a column defines what type of information is gathered (e.g., name, hire date, salary) and a row stores that information (e.g., a row exists for each salesperson). A row of data is also referred to herein as a "record," and a column of data is referred to herein as a "field." A "relational database" is a database having multiple tables whose records are linked together by keys.

Early in the Web's history, the HyperText Markup Language, commonly referred to as "HTML," was developed. HTML is a language that describes a Web page, and it is interpretable by virtually all commercially-available Web browsers.

One disadvantage to using an HTML document for database access applications is that HTML document based access is very inefficient. If an HTML document is being used to display information from a database lookup, then each time the user requests a different set of data, the server must invoke a "Common Gateway Interface" or "CGI" script which interacts with the database manager to obtain the data. Then the server must send all information on the page to the browser. Even though the information in only a single field is different (i.e., the field containing the new set of data), all static and unmodified page information must also be downloaded. This HTML limitation leads to slow and inefficient database access. In addition, the CGI scripts add a layer of processing between the server and the database, thus adding a level of inefficiency to the system.

Another problem with using pure HTML documents for database applications springs from the interactive nature of such applications. Database access is considered an interactive Web application because it often requires a client computer to interchange many messages with a server. This is particularly true when a user wants to access, via a Web page, a large number of records within a database table.

HTML was developed primarily as a language to enable text displays, and it is not well-suited to interactive applications, including database access and manipulation applications. Therefore, many Web pages, including database-oriented Web pages, have added Java, JavaScript, and ActiveX controls to their HTML documents in order to provide better interactive capabilities. Unfortunately, however, the use of Java, JavaScript, and Active X controls pose serious security problems to the integrity of computers and computer networks.

Java is a programming language which is specially adapted to support the development of Internet applications. Java enables an application designer to transport objects across the Internet, hence enabling database access. During an interactive session with a Web page, Java, JavaScript, and Active X operate similarly. In the interests of brevity, only Java is discussed, although the security problems pertaining to Java exist also with JavaScript and ActiveX.

A Java "applet" is a Java program specifically designed for incorporation by an HTML document. Rather than including the actual applet code within an HTML document, "canned" applet code is often downloaded from somewhere else on the Web and then executed on the client machine. Such an applet is referred to generically as a "downloaded executable." In order to download an applet, an HTML document would include, among other things, the Uniform Resource Locator, or "URL," identifying the location of the applet on the Web. For example, an HTML document could invoke an applet called "Clock" stored at http://java.sun.com/openstudio/index.html. During operation of a Web page which invokes that applet, compiled "Clock" applet code is downloaded from "java.sun.com" to the client machine. The client's browser then executes the applet on the client machine.

One enormous problem which faces Web page users is the security risks created by allowing downloaded executables to be run on the client machine. The Java applet is a major culprit, although similar security problems exist with JavaScript and ActiveX. Java applets, which can be downloaded from anywhere, may include "malicious" code. Upon execution of the downloaded applet, such applet could, for example, perform unauthorized file operations on the client machine.

Several solutions have been developed to deal with the threat of the malicious Java applet, but none have yet proved to be efficient and foolproof. For example, Finjan Software has developed the "SurfinShield Xtra" tool which, when a browser attempts to download an applet or control, scans the item in a fashion similar to an antivirus program. Unfortunately, many Web pages include numerous applets, and the scanning operation can substantially increase the time necessary to download and display a page. In addition, any antivirus-type tool is only as good as the level of ingenuity of the malicious-code creators at the time the antivirus tool is released. Therefore, it is likely that a user would need to update its antivirus-type software on a regular basis.

Microsoft recently released a similar antivirus-like solution called "Dynamic HTML," or "DHTML," which is intended to replace ActiveX. DHTML is more secure than ActiveX because it is interpreted by the browser, which can override the code and prevent system violations. However, as with HTML, DHTML requires a server to dynamically create a Web page each time an update to the page is requested. For example, if a user interacting with a DHTML-generated page requests a new piece of data in a single field within the page, a CGI script would be invoked at the server to regenerate the entire page, even though only one piece of data changed. Thus, DHTML may reduce some security risks, but it requires developers to create server-side CGI scripts, and DHTML also has efficiency problems when used in database applications.

Besides the security risks associated with using downloaded executables within an HTML document, another challenge to providing interactive database access is that the nature of Web communications makes state management difficult. "State management" refers to the maintenance of information which describes the particular state that a program is in. In a database application, state management enables a system to keep track of who is accessing a database, what records that user has accessed, and what records would be next.

To illustrate the Internet-related state management problem, a brief Internet data access scenario is described. When a user's client machine requests, via a Web page, access to an initial set of data accessible to a remote server, the client browser establishes a connection with the remote server, sends a request, receives the requested data (if it is available), and closes the connection. When the client machine requests the next set of data, the browser must re-establish the connection with the remote server and send a new request. However, the remote server views the request in a vacuum and, thus, has no idea that the client previously requested records, what records the client previously requested, or what records would be next for that client. The browser also does not keep track of state information. Therefore, prior art systems did not maintain any state management information or they performed state management in an inefficient manner by allocating resources for each client, hoping the client would come back. The latter approach consumes great amounts of server resources and also limits the number of possible users.

In the Local Area Network ("LAN") and Wide Area Network ("WAN") situations, a persistent connection to the server is maintained, thus providing easy access and state management by the server. So, there is never any doubt about which database table a user is connected to, what record of that table the user is currently accessing, what record the user previously accessed, or what record is the next record. In the LAN/WAN situation, it is easy to provide state management for one or more simultaneous users. However, a persistent connection would be inefficient for Internet applications because it would consume too much bandwidth and other system resources.

Because prior-art servers were unable to maintain state information, several applications have been created to provide some semblance of state management in the interest of enabling a user to browse information within a database. One such tool is "IntraBuilder" from Inprise Corporation (a.k.a. Borland International). IntraBuilder is a tool which runs on the server machine. When a new user requests access to a database, the IntraBuilder tool creates an "agent" on the server for that user. The agent is responsible for knowing what user it is associated with and for providing state management for that user. One disadvantage to this agent concept is that hundreds or even thousands of agents could simultaneously exist on a server which provides access to one or more particularly-popular databases. The presence of a substantial number of agents is a burden on the server and limits the server's ability to provide database access.

Another problem originally encountered with the IntraBuilder tool was that the browser had difficulty positioning an active page component (i.e., an element of a Web page which includes data) in the proper place on the page. The browser would independently calculate the component's position. More often than not, the browser-calculated position would be different from the desired position.

In order to alleviate this problem, Netscape apparently modified its browser to recognize the messages coming from the server side when the Web page is posted. That enhanced the Netscape browser's ability to post the information in a relatively close position to the desired position. However, the Netscape modification has not resulted in an optimum solution because it only works for a Web page with a relatively small number of components (e.g., approximately 20). Many Web page designers incorporate numerous components, sometimes in the hundreds. For example, a particular database may have sixty or more fields that a designer would like the page to display. Thus, the Web page would require sixty or more components. The current Netscape browser would be ill equipped to handle such a page.

Another tool for providing database access is "Emrys Visions" from Emrys Solutions, Inc. The Emrys Visions tool is located and runs on the client machine. The Emrys Visions tool also seeks to solve the problem of state management inherent in the make-transfer-break data transfer protocol by forcing the browser to maintain a persistent connection with the server during the entire database browsing session. Although this enables state management to be maintained, a major disadvantage to the Emrys Visions solution is that it forces the client to continuously consume bandwidth, both on the client and server sides. As stated previously, such a persistent connection is undesirable for an Internet application because it consumes substantially more bandwidth than may be necessary.

Another disadvantage to prior-art systems is that they do not adequately provide the ability to "briefcase" data. "Briefcasing" refers to a user's ability to download data from a server to his client machine, manipulate the data offline, re-connect to the server at a later time, and post his changes to the database. The inability to briefcase is related to the inability to maintain state information adequately. In prior-art systems, because of the lack of state management capabilities, the server would have no idea how to reconcile a user's changes with existing records or with changes posted by other users. Although one solution might be to enable a server or database manager to place a lock on the records to prevent other users from making changes after one user downloads those records, such an approach would be impractical in a situation where many users need to manipulate the data.

One additional disadvantage to prior-art systems is that current Web browsers enable a user to jump from page to page, but a single instance of a browser will not display multiple pages simultaneously. Therefore, if a user wants to view multiple pages simultaneously, the user must launch another instance of the Web browser. This consumes additional client computer resources and complicates the user's interaction with the browsers. In addition, no mechanism exists to link the simultaneously displayed pages. The user interacts with each page independently.

What is needed is a way to access data over the Internet which is efficient and provides state management without unduly consuming bandwidth or other server resources. What is further needed is a database access tool which eliminates security risks imposed by malicious code without a reduction in download and display efficiency. What is further needed is a way to provide an Internet-based "briefcasing" capability for database access and modification. What is further needed is a way for Web-page users to view and interact with multiple pages simultaneously, surfacing the relationships of database tables without launching another instance of the Web browser.

BRIEF DESCRIPTION OF THE DRAWINGS

FIG. 15 illustrates a flowchart of a method for scrolling through data in association with linked pages in accordance with a preferred embodiment of the present invention.

DESCRIPTION OF THE PREFERRED EMBODIMENT

The method and apparatus of the present invention provides a way to access data over the Internet while providing efficient, accurate state management without unduly consuming bandwidth or other server resources. The method and apparatus of the present invention further provides a way to provide an Internet-based "briefcasing" capability for database access and modification. The method and apparatus of the present invention further provides a database access tool which eliminates security risks imposed by malicious code without a reduction in download and display efficiency.

In a preferred embodiment, the method and apparatus of the present invention include a Web page development tool which enables a developer to create a Web page document which includes executable code, thus eliminating the need to download foreign executables during display and manipulation of a page. This virtually eliminates the risk that malicious code will be downloaded and allowed to wreak havoc on the client machine.

The pages developed in accordance with a preferred embodiment are particularly adept at handling database access and manipulation, in part because the client machine performs the state management tasks. This reduces the load on the server to maintain numerous "agents" and also eliminates the need to maintain a persistent connection during a user's database access session. Finally, it enables a user easily to "briefcase" data, edit it offline, and reconcile the modified data with the database entries at a later date.

In a preferred embodiment, the method and apparatus of the present invention utilize a modified version of a commonly known, object-oriented software language in order to provide a very short learning curve and a likelihood that most platforms will support the language. In a preferred embodiment, the language is object oriented Pascal with some extensions, although other languages also could be used such as, for example, C++.

Finally, a preferred embodiment of the method and apparatus of the present invention provides encryption and decryption to increase the security of the system. In a preferred embodiment, such encryption and decryption is performed on Web pages, data requests, and data messages.

Figure 1:
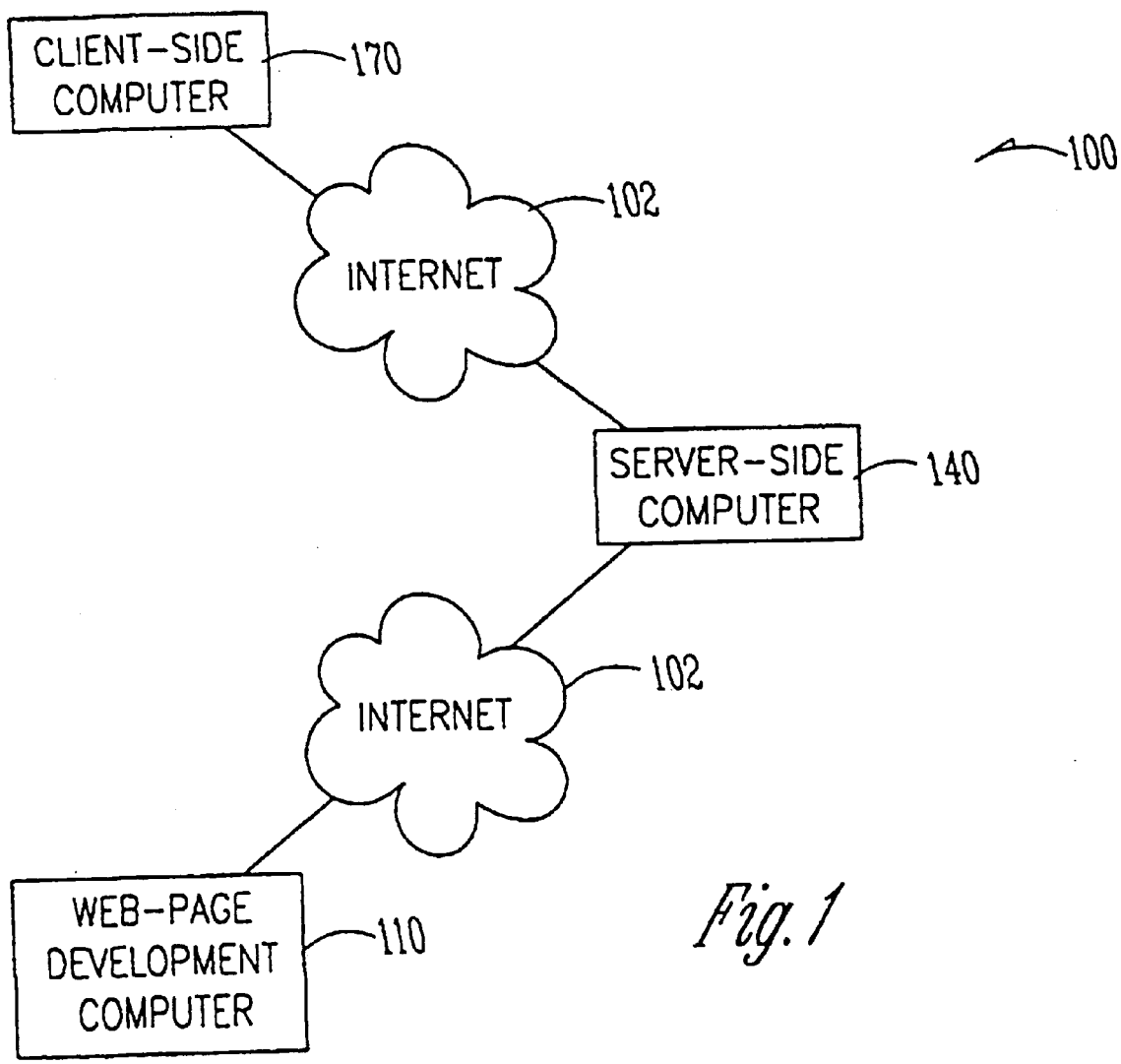
FIG. 1 illustrates a simplified hardware diagram of a system in accordance with a preferred embodiment of the present invention.

FIG. 1 illustrates a simplified hardware diagram of a system in accordance with a preferred embodiment of the present invention. System 100 includes Web page development computer 110, server-side computer 140, and client-side computer 170. Web page development computer 110 and client-side computer 170 are shown connected to server-side computer 140 through the Internet 102. In alternate embodiments, the method and apparatus of the present invention also could be used in a system where either or both computers 110, 170 are connected to server-side computer 140 over a LAN, WAN, or other network or link, where such link could be electronic, optical, wireless, or some combination thereof.

Web page development computer 110 and client-side computer 170 could be the same or different machines. Because the Web page development and client functions are different, they are shown as separate computers for the ease of illustration. In addition, only one Web page development computer 110 and one client-side computer 170 are shown connected to server-side computer 140. In some cases, substantially more than one of computers 110 and/or 170 could be connected to server-side computer 140.

A brief explanation of the interaction between computers 110, 140, and 170 follows. First, Web page development computer 110 is used by a human developer to create a Web page in accordance with a preferred embodiment. In a preferred embodiment, Web page development computer 10 then encrypts the page, although the encryption step is not essential. Web page development computer 110 then sends the Web page to server-side computer 140 over the Internet or some other link. When the Web page is requested by client-side computer 170, server-side computer 140 sends the Web page to client-side computer 170 for its use. The Web page can then request data from server-side computer 140. The Web page maintains state information during the database interaction session, and possibly beyond.

In an alternate embodiment, Web pages created by computer 110 could be sent to the server in some other fashion besides sending the information over a physical link to the server. For example, one or more Web pages could be stored on a disk or other storage medium, and the pages stored on that storage medium could be loaded onto the server-side computer 140.

The functionality, method, and more detailed apparatus associated with Web page development computer 110 are described in conjunction with FIGS. 2–6. The functionality, method, and more detailed apparatus associated with server-side computer 140 are described in conjunction with FIGS. 7–9. Finally, the functionality, method, and more detailed apparatus associated with client-side computer 170 are described in conjunction with FIGS. 10–15.

In order to build a Web page or to edit a previously-created page, the page developer, via Web page development computer 110, invokes a program which provides the functions described below. After being invoked, the program displays a "page editor display" which includes several fields which the user manipulates to create a Web page.

Figure 2:
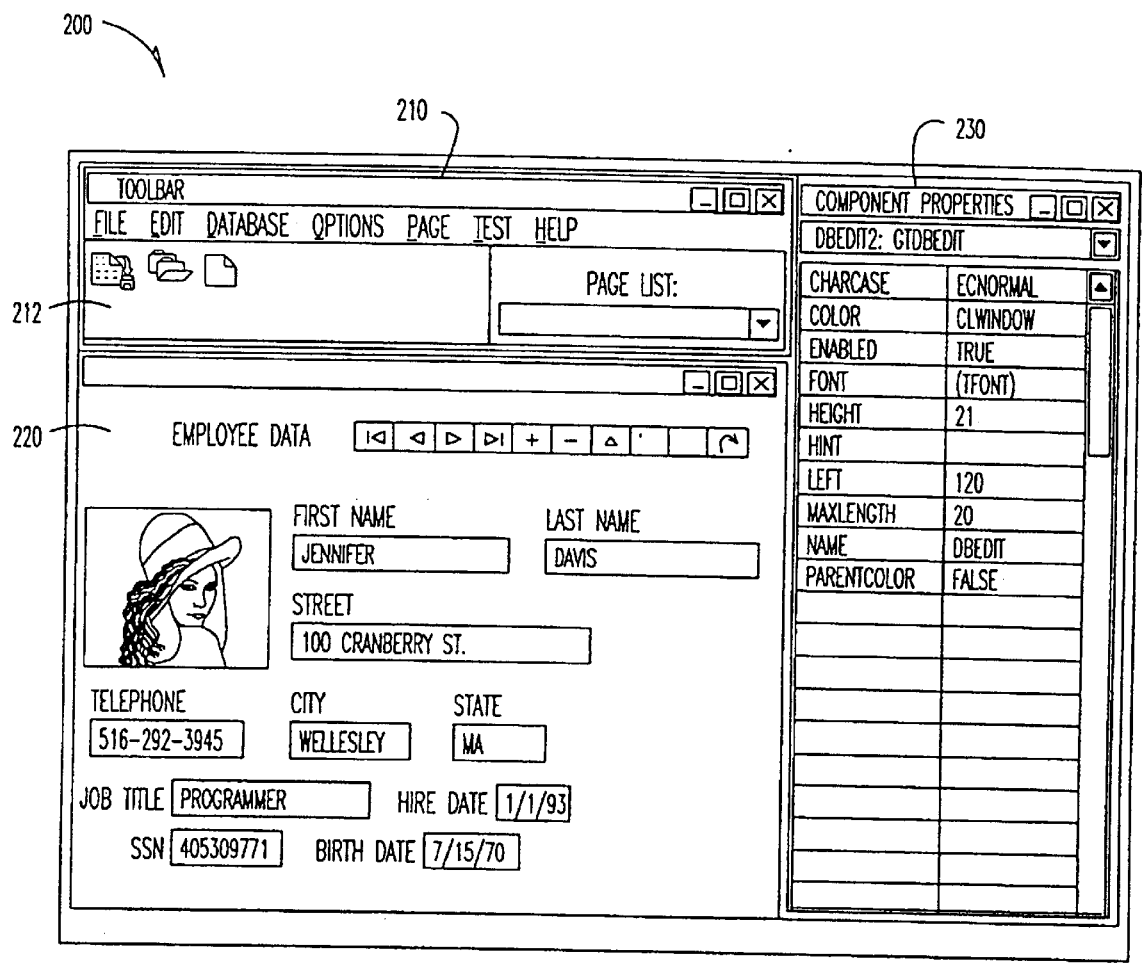
FIG. 2 illustrates a page editor display in accordance with a preferred embodiment of the present invention.

FIG. 2 illustrates a page editor display in accordance with a preferred embodiment of the present invention. The page editor display 200 shows three fields 210, 220, 230. Page builder field 220 shows the Web page currently under design. Upon creation of a new page, page builder field 220 would show a blank page. The page designer would then add components to the blank page to create a new page. In a preferred embodiment, a designer could simultaneously edit multiple pages using the tool. In a preferred embodiment, when multiple pages are being edited, the currently active page would be shown within page builder field 220, and the other pages would be hidden. In an alternate embodiment, such pages would be shown cascaded within page builder field 200.

Component properties field 230 includes a list of properties that a particular component may have. In the example shown, the developer has selected an edit box component 222 within page builder field 220. The selected component is used to display the "First Name" of an employee. The particular component properties for such a text component are listed in the left column of the component properties field 230, and the value for each component property is listed in the right column. Component properties could include, for example, component position information, size information, color, text characteristics, and other relevant properties. Originally, the component properties would be default properties for the particular type of component. If desired, the developer can edit the entries in the right column of component properties field 230 to specify different values of the component properties for the selected component.

Toolbar field 210 includes icons 212 which enable the developer to perform functions such as adding a new component to a page, editing source code or properties for a component, linking a component with a component on the same page or another page, and aligning components, among other things.

In a preferred embodiment, in order to add a component to a page, one such icon 212 produces a drop-down menu of components which could be added to the page (e.g., by dragging). These selectable components could include, for example, a button, an edit box for inputting text, a label, an image, an audio icon, a data display box, a menu, a panel, and a hyperlink, although more, fewer, or different components also could be selectable. Adding components is described in detail in conjunction with FIG. 3, steps 320–324.

In a preferred embodiment, the developer could add both visible and hidden components to a page. A visible component may be, for example, a button or image that a user may or may not be able to interact with. A hidden component may, for example, not be visible to the user, but may initiate executable code upon some event occurring. For example, one hidden component could be a component which enables a Web page to increase or decrease its display resolution automatically, depending upon what resolution screen the page is asked to be displayed upon. Such code could be invoked when the Web page document is received by the client computer. The code would determine the computer's screen resolution and, if it did not match the Web page's current resolution, the code would multiply or divide the number of pixels and resolution necessary to display the Web page at the proper resolution on the client machine.

Also in a preferred embodiment, a developer could include custom-developed components which are not currently available in the prior art. For example, in a preferred embodiment, one novel component which can be included on a page is a "report generation" component. A report generation component could appear in the form of a button, for example, which a developer adds to a Web page. When a user clicks the report generation component, the page could execute code which extracts data and information from the Web page, formats that data into a report template, and creates a report document which the user could then store, view, and/or print. In a preferred embodiment, the report template would be defined by the developer when the Web page was developed. In an alternate embodiment, a default template could be used. In another alternate embodiment, the user could specify the format of the report at the time that the user requested the report. The "report generation" component provides a distinct advantage over prior-art methods which can provide a screen dump of a Web page, but cannot neatly format information on the page into a well-formatted report or other document. The method and apparatus of the present invention enables a user to create such a well-formatted report or other document from a Web page.

Referring again to FIG. 2, another icon 212 could cause the tool to invoke a code editor screen, which enables a developer to associate code to a particular component and to specify which events cause that code to be executed. For example, when a particular button component is "clicked," a developer may want certain code to execute which causes a next database record to be requested. The page developer could use the code editor screen to specify, for that button component, that upon the event "clicked," code would be executed which causes the next record to be requested. The code editor screen is discussed in detail in conjunction with FIG. 4, and the process of editing code is discussed in detail in conjunction with FIG. 3, steps 340–344. In a preferred embodiment, the code editor utilizes an object oriented language such as Pascal, preferably with some extensions. In alternate embodiments, other languages could be used such as, for example, C++.

Another icon 212 could enable components to be linked within the same page or different pages. When two components are linked in accordance with a preferred embodiment, a user could scroll through data within a first component, and the second component would automatically update to show corresponding information. Component linking is described in detail in conjunction with FIG. 3, steps 330–336.

Once a developer has selected and placed all desired components on the page, the developer indicates that he is done, and the Web page development tool links the components within the page, compiles the page, and stores the page in memory. The Web page could then be edited by re-invoking the page development tool, or the page could be deployed as is discussed in detail in conjunction with FIG. 7.

Figure 3:
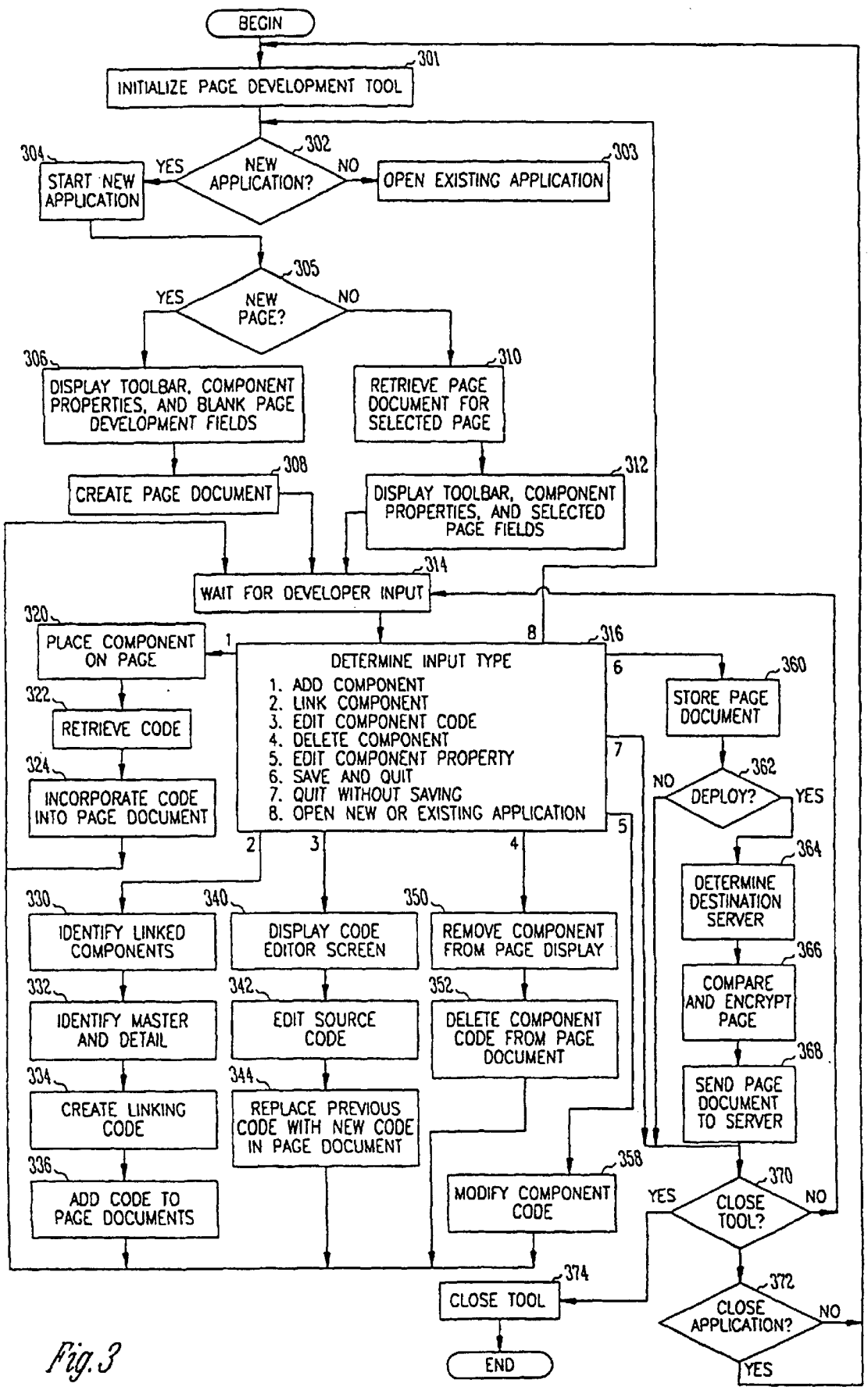
FIG. 3 illustrates a flowchart of a method for creating and deploying a Web page in accordance with a preferred embodiment of the present invention.

FIG. 3 illustrates a flowchart of a method for creating and deploying a Web page in accordance with a preferred embodiment of the present invention. In a preferred embodiment, the method is performed on a computer such as Web page development computer 110, FIG. 1.

The method begins by performing the step 301 of initializing the page development tool. As described previously, a developer initializes the page development tool when he wants to create a new page or edit a previously-created page. Upon receipt of the initialization command, computer 110 retrieves the tool's executable code from memory and initiates execution of the code. In a preferred embodiment, the tool displays a page editor display (e.g., display 200, FIG. 2), and gives the developer the option, in step 302, of whether to start a new application or open a previously-created application. In a preferred embodiment, this option could be given as a selectable menu item. In an alternate embodiment, the option may be given via a prompt from the tool.

All Web pages are created as part of an application concept, where each application concept is represented by an application file which can group information about one or more Web page files within it. Therefore, information about a previously-created page file would exist within a previously-created application file. If a developer wants to create a new page, the developer must associate the new page file with a previously-created application file, or the developer must start a new application file.

If, in step 302, the developer indicates that he wants to open an existing application, then the existing application file is opened, in step 303, and the main page file of that application is automatically retrieved, in step 310. Steps 310–312 are described in more detail, below.

If, in step 302, the developer indicates that he wants to start a new application, then a new application file is started in step 304. The new application file can then be used as a vehicle to store information about Web pages. After step 304, the tool gives the developer an option of creating a new page or editing a previously edited page in step 305. In a preferred embodiment, this option could be given as a selectable menu item. In an alternate embodiment, the option may be given via a prompt from the tool. In some cases, it may be possible for a developer to open a Web page file directly, without first opening its associated application file.

If, in step 305, a determination is made that the developer wants to create a new page, the tool displays a blank page, toolbar field, and component properties field on the developer's monitor in step 306. In step 308, the tool also creates a "page document," similar to an HTML document, which the tool will edit as the developer edits the page. Initially, the page document will be structured as if it describes a blank Web page.

If, in step 305, a determination is made that the developer wants to edit a previously-created page, the tool retrieves a copy of the associated page document from memory in step 310, and displays the page, along with the toolbar field and component properties field in step 312.

The tool then waits for additional developer input in step 314. Once developer input is received, a determination is made, in step 316, what type of developer input has been received. In a preferred embodiment, the following types of developer inputs are possible: 1) a new component has been added to the page; or 2) the developer wishes to link components; or 3) the developer wishes to edit the component code; or 4) the developer wishes to delete a component; or 5) the developer wishes to edit a component property; or 6) the developer wishes to save the page and quit; or 7) the developer wishes to quit without saving the page; or 8) the developer wants to enter a new or existing application. Each of the developer inputs is described below. For ease of illustration, the flowchart includes steps and decisions only relevant to creating, compiling, and storing a Web page. It does not contemplate all possible developer inputs. In alternate embodiments, additional or different developer inputs are possible.

1. Add New Component

When the developer input indicates, in step 316, that the developer has placed a new component on the page (e.g., using a drop down menu from icons 212, FIG. 2), the tool places the selected component on the page in step 320 and retrieves the associated default code for that component in step 322. The component code is similar in function to a downloaded executable (e.g., a Java Applet), except that the component code will eventually be compiled as part of the Web page in accordance with the present invention, rather than being accessed over the Internet during runtime as a downloaded executable would be. Incorporation of the component code into the Web page eliminates the risk that malicious code will be downloaded and executed for that component.

The default code is incorporated into the page document in step 324, including all information relevant to the type, position, and other properties of the component. In a preferred embodiment, the position of the component is determined by the location where the developer dragged and dropped the component or a position specified by the developer in the component properties field (FIG. 2, field 230). In an alternate embodiment, the component position could be a default position which the developer could later modify via the component properties field or using the mouse.

As discussed previously, a number of different types of components could be added to a Web page. Because the addition of a data component includes several important details, addition of a data component is discussed in detail in conjunction with FIG. 5. After step 324, the method then returns to step 314 to wait for additional developer input.

2. Link Components

When two components are linked in accordance with a preferred embodiment, a developer could scroll through data within a first page, and data displayed on a second page would automatically update to show corresponding information. For the purposes of this description, components are linked between pages, although components could be linked within the same page as well.

The linking capability of the Web development tool is well suited to link data components. In alternate embodiments, the linking capability could be used to link other types of components. In the area of data, the linking capability could be used, for example, to link one or more fields within one table to a different, but corresponding set of fields within another table in a relational database. Alternatively, the linking capability could be used to link fields within the same table.

For example, a developer may wish that a first page include data components which specify a customer ID number, address, and phone number from a "customer information" table of a relational database. The developer may also wish to design a second page that includes a data component which lists a customer's ordering history, where such information is stored in an "order information" table of the same or a different relational database. Using the method and apparatus of the present invention, the developer could link the customer ID number component on the first page with the ordering history component on the second page. Then, when a user of the first and second pages scrolls through customer ID numbers on the first page, the ordering information for each associated customer would automatically appear on the second page. A similar linking example is described in more detail in conjunction with FIGS. 13–15.

When the developer input indicates, in step 316, that the developer wishes to link two components, then the developer identifies, in step 330, which components are to be linked. Identification of the linked components could be made through one or more prompts from the Web development tool, or could be performed by the developer selecting the components which he would like to link, then clicking a "link components" icon (e.g., icon 212, FIG. 2).

In a preferred embodiment, the developer is asked to specify a "Master" page and a "Detail" page. In an alternate embodiment, the identity of the Master or Detail pages could be some default (e.g., the first component selected could define the Master page). A Master page is the page which displays the "master" information to which the "detail" information on a Detail page is linked. Either or both the Master page and the Detail page include code which will formulate and send a data request to the server for both the data associated with the Master page and the data associated with the Detail page. Using the above example, if the Master page were the page having the customer ID number component (i.e., the "master" information) and the customer ID number were linked to a Detail page's ordering history data field (i.e., the "detail" information), then the code associated with either the Master page or the Detail page would, during operation, request the next customer ID number and the ordering history data when both the Master and Detail pages are open. If the Master page requested the data, then after receiving the next customer ID number and that customer's ordering history, the Master page code would "send" the ordering history data to the Detail page. If the Detail page requested the data, then after receiving the next customer ID number and that customer's ordering history, the Detail page code would "send" the next customer ID number to the Master page. In an alternate embodiment, both pages could include code which would separately request the data associated with each linked component.

After the Master and Detail pages are identified, linking code is created in step 334. During operation, linking code enables a page to formulate a request for data which identifies the fields which are displayed on the page, and which identifies the fields which are displayed on other linked pages. In addition, the linking code causes received data to be parsed, and the linked-page data to be sent to the linked page. The linking code also enables a page to receive the data from another page, and to automatically display the data (e.g., in the ordering information component).

In step 336, the linking code is added to the page documents for the Master and Detail pages. The method then returns to step 314 to wait for additional developer input.

3. Edit Source Code for Component

When the developer input indicates, in step 316, that the developer wishes to edit the source code for a selected component, the tool displays, in step 340, a code editor screen in which the current source code for that component is included. In step 342, the developer then edits the source code via the code editor screen.

Figure 4:
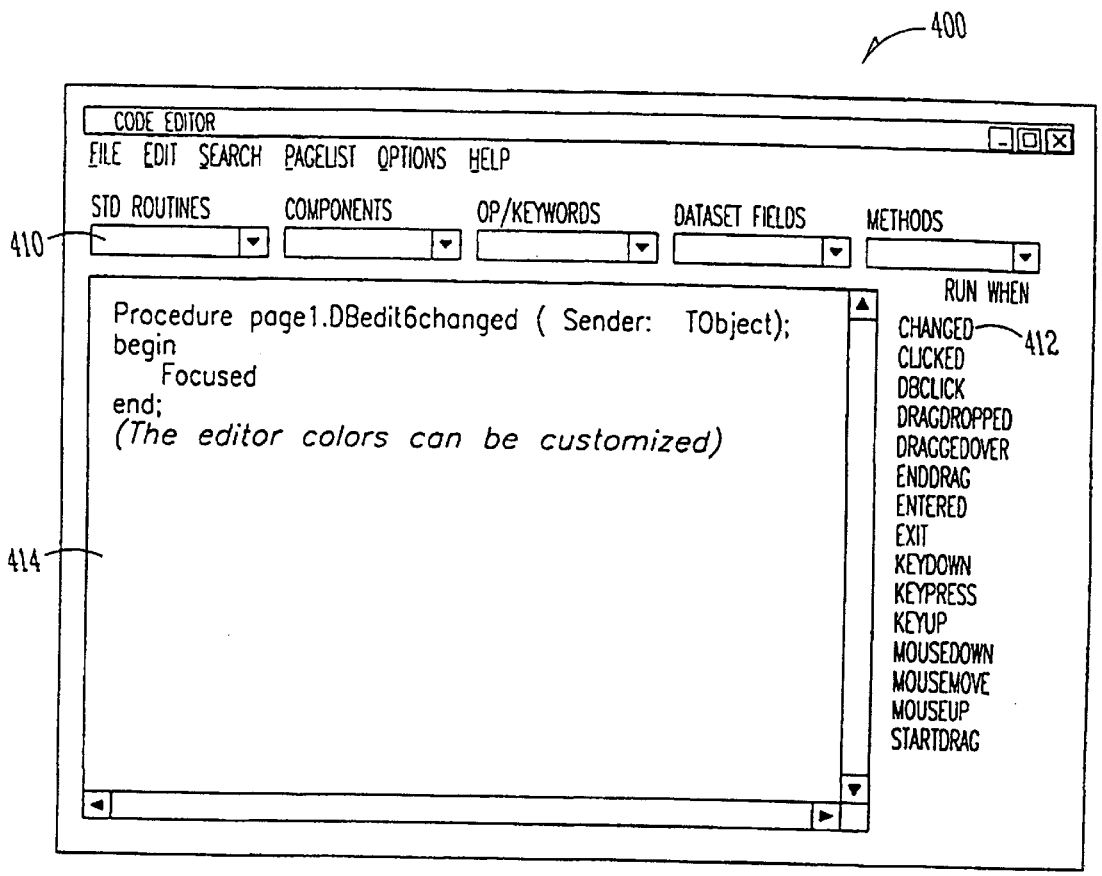
FIG. 4 illustrates an exemplary code editor display in accordance with a preferred embodiment of the present invention.

FIG. 4 illustrates an exemplary code editor screen in accordance with a preferred embodiment of the present invention. Code editor screen 400 includes a command line 410, selectable action list 412, and source code display area 414. After a component is selected and the code editor screen 400 is invoked, source code display area 414 initially includes the current source code for that component. The developer can then edit the displayed source code. Via selectable action list 412, the developer can specify what action will invoke that particular code. For example, the developer can specify that the code should be invoked when information is "Entered" into a text field. As another example, the developer can specify that a "KeyUp" keystroke will cause the component to scroll upward through a list of data.

Command line 410 includes fields which help the developer in the editing process. For example one entry in command line 410 can enable the developer to access standard routines (e.g., absolute value or "Abs"), and include those standard routines in the source code. Another field in command line 410 could help a developer to identify tables within one or more databases, and to drop the table names into the code.

Component code could include many different types of instructions. For example, when a customer number is entered into an edit box, the code could cause a data request to be created and sent to a server. Upon receipt of the data, the code could cause the data to be displayed in various other components.

A developer can also provide access protection as part of the component code. For example, if a particular database has restricted access, the developer can cause the page to prompt the user for access information (e.g., a user name and/or password) before the page will request the desired data. Such user access could be controlled, for example, by including a list of valid users, user profiles, and/or passwords within the page document or stored at a server-side computer. If the entered access information does not match a stored user name, profile, and/or password, then the page could inform the user that access is denied. Otherwise, the page would request and provide the specified data.

Besides access protection, a developer can incorporate other user privileges into the page document code and/or component code. For example, a developer can incorporate code which controls which users are allowed to briefcase a Web page. If a user does not have such privileges, the user would not be allowed to store a Web page and/or associated data on his client computer. A developer also can incorporate code which controls which users are allowed to modify data within a database. If a user does not have modification privileges, the page will not allow the user to post changes to records within the database.

Once the developer has finished editing the source code for the particular component, he can save the changes and quit the editor.

Referring back to FIG. 3, the modified source code replaces the previous version of code in the page document in step 344. The method then returns to step 314 to wait for additional developer input.

4. Delete a Component

When the developer input indicates, in step 316, that the developer wishes to delete a component that currently exists on the page, the tool removes the component from the display page, in step 350, and the component's associated source code is deleted from the page document in step 352. The method then returns to step 314 to wait for additional developer input.

5. Edit Component Property

A developer can edit a component property via component property field 230 (FIG. 2) in accordance with a preferred embodiment. In a preferred embodiment, the developer would simply modify the property value in the right column of field 230. When the developer input indicates, in step 316, that the developer wishes to edit a component property (e.g., the developer has entered a new property value), then the component code is modified within the page document in step 358. Such modifications could, for example, indicate that the component should be displayed in a different position, should have a different size, or should use a different font or color. The method then returns to step 314 to wait for additional developer input.

6. Save Page and Quit

When the developer input indicates, in step 316, that the developer wishes to save the page and quit, the tool stores the page document in memory in step 360. In a preferred embodiment, the developer is then given the option of deploying the page document to a destination server. If, in step 362, a determination is made that the developer does not want to deploy the page, then the tool is closed in step 370 (unless other pages are being edited), and the method ends.

If, in step 362, a determination is made that the developer chooses to deploy the page, then the developer is prompted to identify (e.g., by its URL) a destination server in step 364. After the file server is identified, the page file is compiled and, in a preferred embodiment, encrypted in step 366. In an alternate embodiment, no encryption is performed. The Web page development computer 110 then establishes a link with the destination server and sends the encrypted page over the Internet (or other link) in step 368. A determination is then made whether the developer wants to close the tool, in step 370. If so, the tool is then closed in step 374 (unless other pages are being edited), and the method ends. If not, then a determination is made, in step 372, whether the developer wants to close the current application. If so, then the procedure branches to step 301. If not, then the procedure branches to step 314.

7. Quit Without Saving

When the developer input indicates, in step 316, that the developer wishes to quit without saving, the tool closes itself, in step 370 (unless other pages are being edited), without saving the page file to memory, and the method ends.

8. Open a New or Existing Application

When the developer input indicates, in step 316, that the developer wants to open a new or existing application, then the process branches back to step 302, where the tool determines whether the desired application is new or existing. The procedure then continues as shown in FIG. 3.

Figure 5:
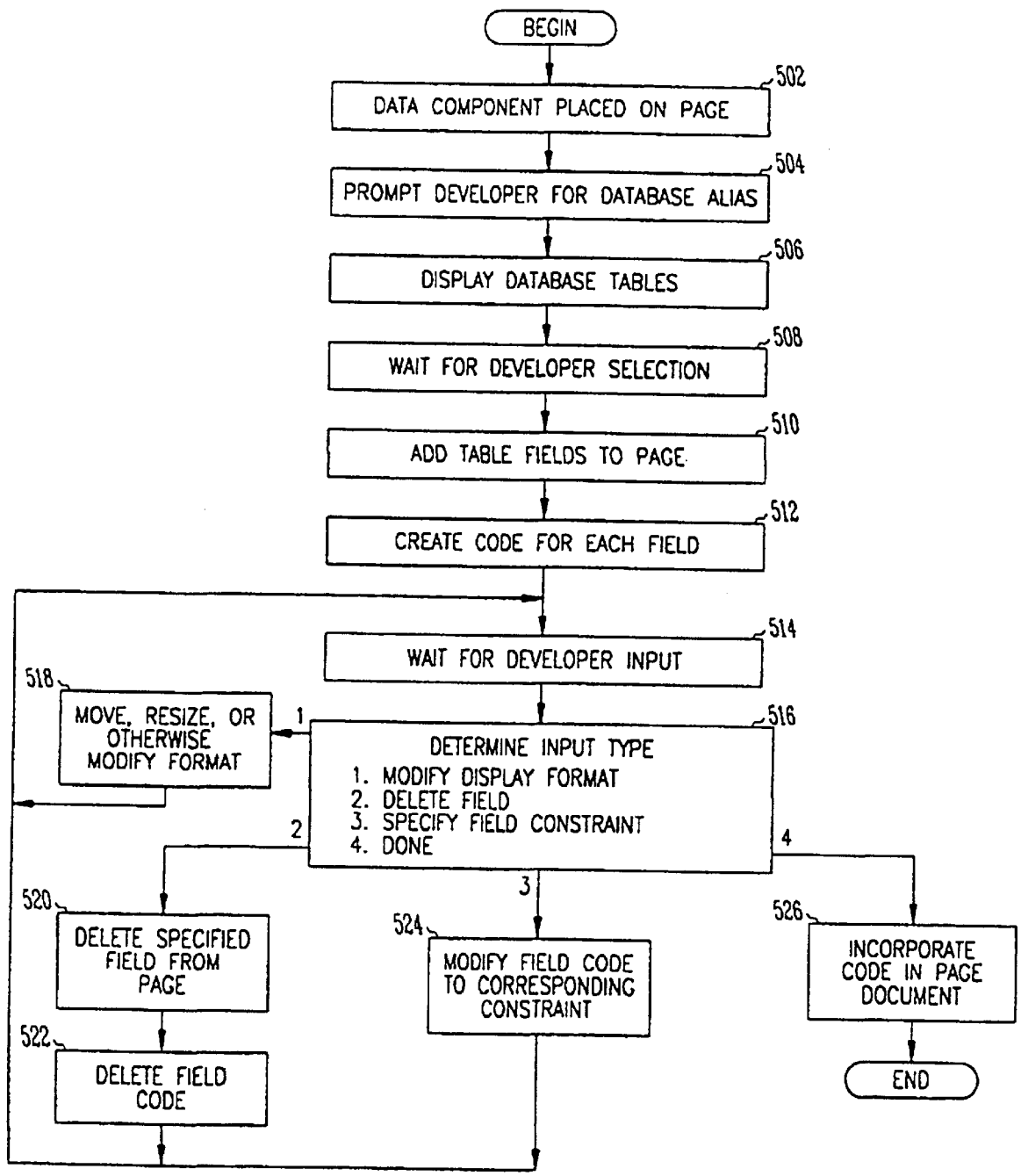
FIG. 5 illustrates a flowchart of a method for adding a database component to a Web page in accordance with a preferred embodiment of the present invention.

FIG. 5 illustrates a flowchart of a method for adding a database component to a Web page in accordance with a preferred embodiment of the present invention. Such a component would be added to a page, for example, in accordance with step 320 of FIG. 3.

The method begins, in step 502, when a developer indicates that he would like to place a data component on a page. In step 504, the Web page development tool prompts the developer for the database alias. For example, the database alias could be a name which the tool uses to identify the path of the database.

Once the tool knows the database alias, the tool displays the names of the tables associated with that database in step 506. The developer is prompted to select one or more tables from the database, and the tool waits for the developer selection in step 508. Once the developer has selected a table (or tables), the tool adds each table field as a separate component to the page in step 510. In an alternate embodiment, the tool could display all fields and allow the developer to select which field (or fields) the developer would like to have added to the page.

When the data components are added to the page, the tool creates the component code for each component in step 512. In a preferred embodiment, the component code would include information necessary to request, receive, and display the data. Typically, if several components include data from the same table, only one of the components needs to perform the actual data request. Such request would request data for each of the related field components. Creation of component code is analogous to accessing code in step 322, FIG. 3.

The method then waits for additional developer input in step 514. Once developer input is received, a determination is made, in step 516, what type of developer input has been received. In a preferred embodiment, the following types of developer inputs are possible: 1) the developer wishes to modify the display format; or 2) the developer wishes to delete a field; or 3) the developer wishes to specify a field constraint; or 4) the developer indicates that he is done. Each of the developer inputs is described below. For ease of illustration, the flowchart does not contemplate all possible developer inputs. In alternate embodiments, additional or different developer inputs are possible.

1. Modify the Display Format

When the developer input indicates, in step 516, that the developer wishes to modify the display format of a particular data component (or components), then, in step 518, the display format is moved, resized, or otherwise modified in accordance with the developer's instructions. For example, a developer may want to align all data components differently from the current alignment. The developer could specify this change in display format, in a preferred embodiment, by selecting an alignment icon (e.g., icon 212, FIG. 2), and specifying the desired alignment. Alternatively, the developer could change a display format by manipulating the component properties field 230 (FIG. 2). The method then returns to step 514 to wait for additional developer input.

2. Delete a Field

When the developer input indicates, in step 516, that the developer wishes to delete a particular field of a table from the Web page, then the tool removes the component from the display page, in step 520, and the component's associated source code is deleted from the page document in step 522. These steps are analogous to steps 350, 352 of FIG. 3. The method then returns to step 514 to wait for additional developer input.

3. Specify a Field Constraint

When the developer input indicates, in step 516, that the developer wishes to specify a particular field constraint, the tool modifies the component code for the particular field to reflect the corresponding constraint in step 524. For example, in a data field that receives text data, the developer could specify that the component should only display data items having a first letter of "A". This constraint would be added to the component code and, upon execution, the component would only display table entries having the first letter of "A". The method then returns to step 514 to wait for additional developer input.

4. Done

When the developer input indicates, in step 516, that the developer is done editing the component code for the field (or fields) is incorporated into the page document in step 526, and the process ends.

Figure 6:
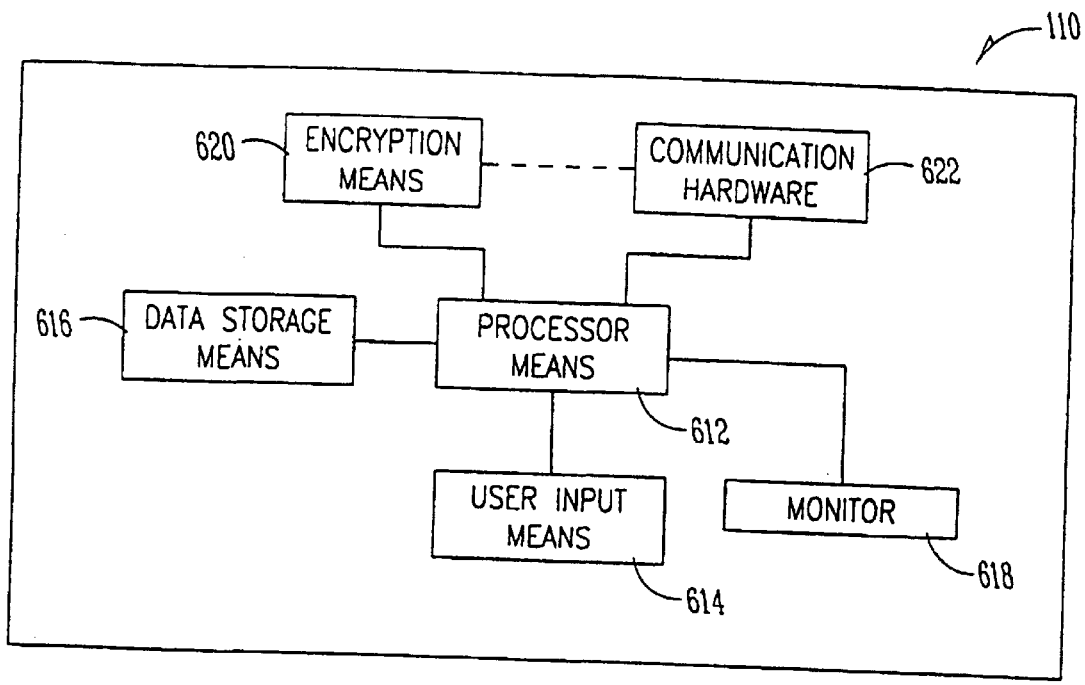
FIG. 6 illustrates a simplified hardware block diagram of a Web page development computer in accordance with a preferred embodiment of the present invention.

FIG. 6 illustrates a simplified hardware block diagram of a Web page development computer 110 in accordance with a preferred embodiment of the present invention. Web page development computer 110 could be, for example, a SUN workstation or another desktop or laptop personal computer. In a preferred embodiment, computer 110 includes processor means 612, user input means 614, data storage means 616, and monitor 618. In addition, computer 110 includes encryption means 620 and/or communication hardware 622, although these two elements are not essential to achieve many of the advantages of the present invention.

Processor means 612 could be, for example, an Intel Pentium processor or other processor suitable for performing the processing functions of Web page development computer 110. These processing functions are described in detail in conjunction with FIGS. 3 and 5, but include, for example, initializing the page development tool (step 301, FIG. 3), creating or accessing a page document (steps 306, 310, FIG. 3), placing a selected component on or removing a selected component from a page (steps 320, 350, FIG. 3), editing component properties (step 358, FIG. 3), editing component code (step 342, FIG. 3), and storing/deploying pages (steps 360–368, FIG. 3).

User input means 614 is coupled to processor means 612, either directly or through various hardware and interfaces. User input means 614 could be, for example, a keyboard, mouse, microphone, speaker, digital video device, or any combination thereof. User input means 614 is the way in which a developer gives commands and/or information to the page development tool. Such commands could include, for example, a command to initialize the tool (step 301, FIG. 3), drag and drop a new component, edit a component property, edit component source code, delete a component, save a page document, quit the page development tool, or deploy a page.

Data storage means 616 is coupled to processor means 612, either directly or through various hardware and interfaces. Data storage means 616 is used to store the Web page development tool code, page documents, source and executable code for components, and other data items. Data storage means 616 could include any type of read only memory (ROM) and/or random access memory (RAM), and could be in the form of magnetic or optical storage medium, such as, for example, hard drives, compact disks, magnetic disks, or any combination thereof. For ease of illustration, only one data storage means 616 is shown. It would be obvious to one of skill in the art, however, that several types of storage would be desirable in order to carry out the method of the present invention.

Monitor 618 is coupled to processor means 612, either directly or through various hardware and interfaces. Monitor 618 is used to display screens associated with the Web page development tool, including, for example, page editor displays (e.g., display 200, FIG. 2) and code editor screens (e.g., screen 400, FIG. 4). Monitor 618 is the primary mechanism for providing visual feedback to the developer during a page-development session, although other means of feedback (e.g., a speaker) also could be used.

In a preferred embodiment, encryption means 620 is coupled to processor means 612, either directly or through various hardware and interfaces. In an alternate embodiment, encryption means 620 is coupled to communication hardware 622. Encryption means 620 is used in a preferred embodiment to encrypt messages, page documents, and/or other information prior to transmission via communication hardware 622. Encryption means 620 also is used in a preferred embodiment to decrypt messages and/or other information received via communication hardware 622. Encryption means 620 could use, for example, nearly any approved encryption algorithm, including public key/private key algorithms, scrambling, or another proprietary algorithm. Encryption means 620 is not essential to the method and apparatus of the present invention, but it provides an enhanced measure of information security.

In a preferred embodiment, communication hardware 622 is coupled to processor means 612 and/or encryption means 620, either directly or through various hardware and interfaces. Communication hardware 622 can be, for example, a modem used to modulate or demodulate information transmitted or received, respectively, over an external link. Such information could be in encrypted or unencrypted form. Alternatively, communication hardware 622 could be a network card, USB, or other communication device.

Although only one processor means 612, user input means 614, and data storage means 616 are shown, any number of processors, user input means, and data storage devices could be used in conjunction with Web page development computer 110.

As described previously in conjunction with FIG. 3, steps 362–368, after creation of a Web page by Web page development computer 110, a developer may then request that computer 110 "deploy" the new Web page. "Deployment" of a Web page refers to the act of sending the page to a server which will then provide access to the page to client computers via the Internet. Web page development computer may send the Web page to the server via the Internet, a LAN, a WAN, any other type of optical, wireless, or wired link (or links), or via a tangible data storage medium.

Figure 7:
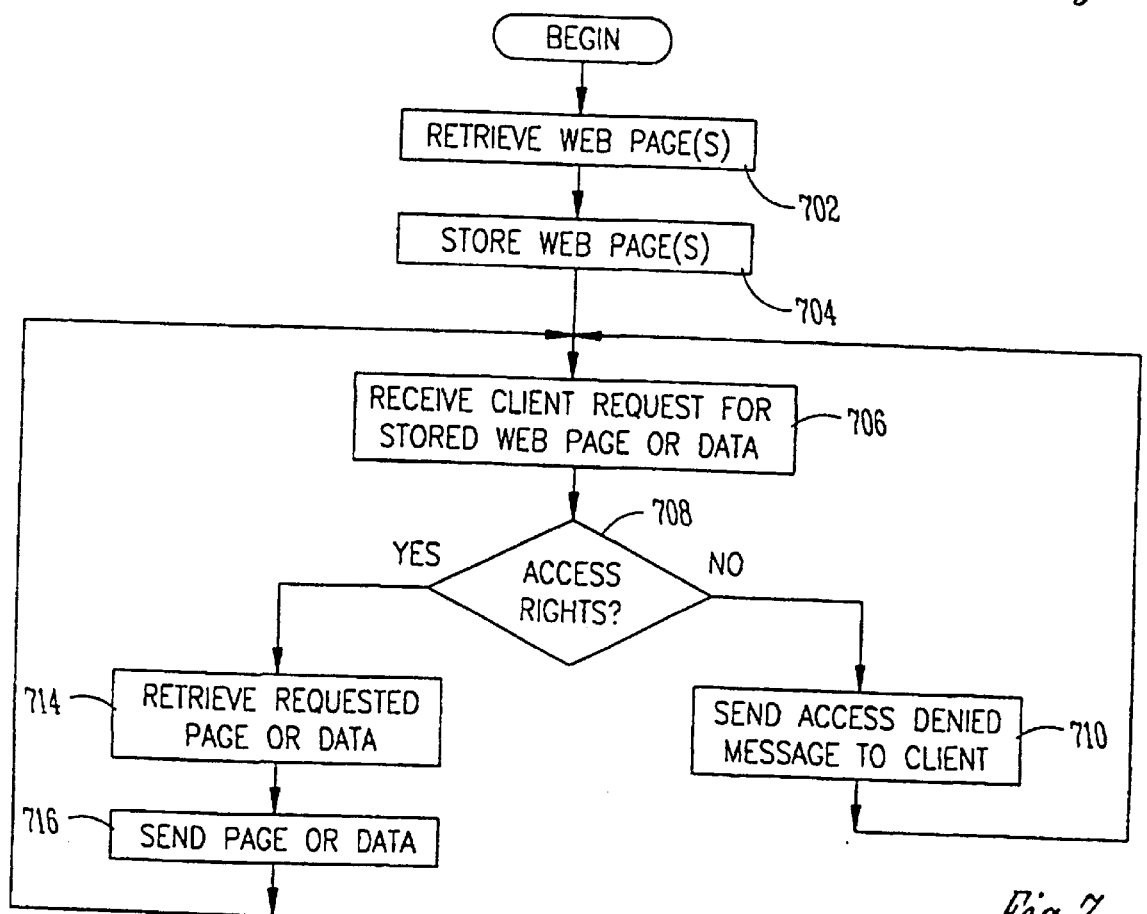
FIG. 7 illustrates a flowchart of a method for receiving, storing, and delivering Web pages in accordance with a preferred embodiment of the present invention.

FIG. 7 illustrates a flowchart of a method for receiving, storing, and delivering Web pages in accordance with a preferred embodiment of the present invention. In a preferred embodiment, the method is performed on a computer such as server-side computer 140 (FIG. 1).

The method begins, in step 702, when the server-side computer receives one or more Web pages. In a preferred embodiment, these Web pages are received from a computer, such as Web page development computer 110 (FIG. 1), over the Internet or some other link. The received Web pages could be in an encrypted or unencrypted form.

In step 704, the server-side computer stores the received Web pages for later access. In a preferred embodiment, if a Web page is received in encrypted form, server-side computer stores the page in the encrypted form. In an alternate embodiment, server-side computer could decrypt the Web page before storing it.

A particular Web page could be stored for any length of time before a client requests that the page be sent to the client computer. In addition, servers often store databases which can be accessed by a Web page application. Requests for Web pages or data come in the form of client messages that may or may not be encrypted.

In step 706, when server-side computer receives a client request for data or a request for a Web page, server-side computer decrypts the request, if necessary. A determination is made, in step 708, whether the page and/or data requires access authorization. Authorization may be necessary for either or both the user and the server. In a preferred embodiment, user authorization is performed on the client computer by the Web page which invokes the request for data or another Web page. Such an approach is desirable because it eliminates the need to send authorization messages back and forth between the client and the server. In an alternate embodiment, such authorization could be performed at the server. The authorization step 708 refers to server authorization in accordance with the preferred embodiment. If necessary, such authorization could be performed for the user as well.

Figure 8:
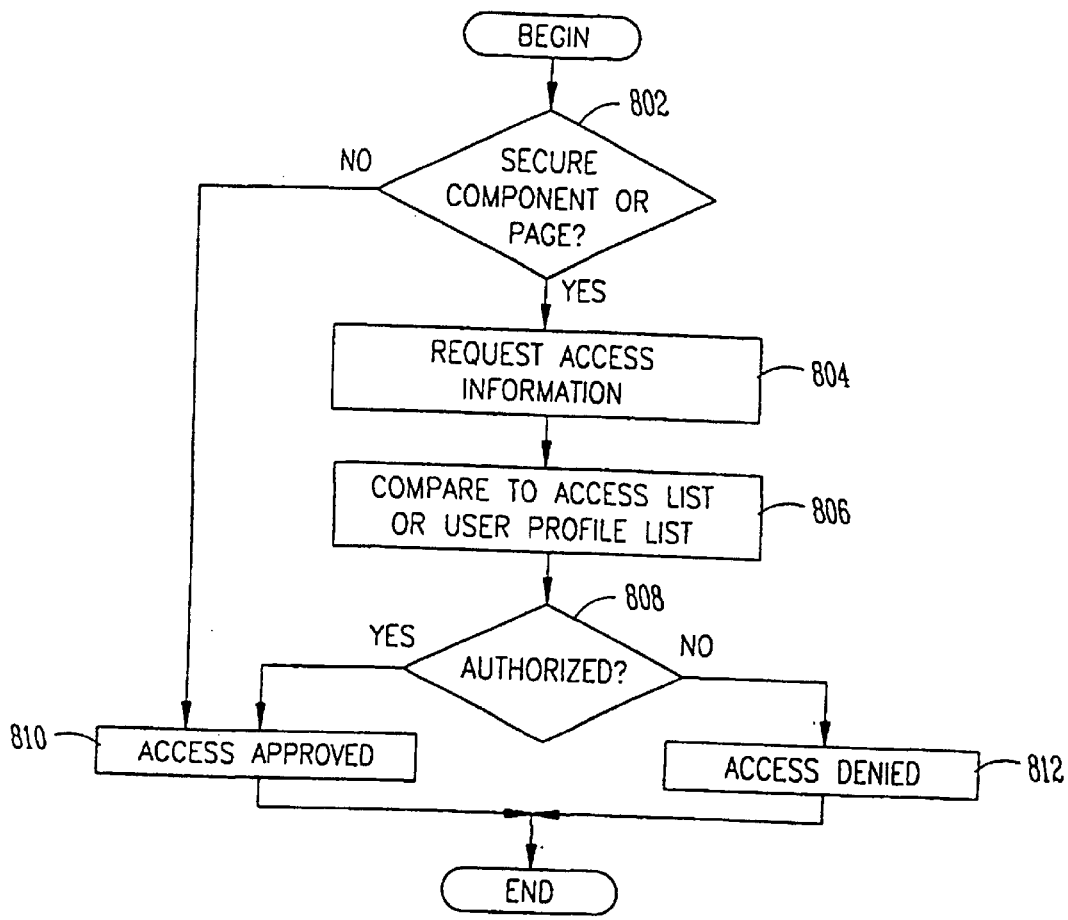
FIG. 8 illustrates a flowchart of a method for controlling access to a Web page or data in accordance with a preferred embodiment of the present invention.

FIG. 8 illustrates a flowchart of a method for controlling access to a Web page or data in accordance with a preferred embodiment of the present invention. The method begins, in step 802, by determining whether the requested page or data is "secure," or requires access authorization. If not, then it is determined that access is approved in step 810 and the procedure ends.

If it is determined, in step 802, that the requested page or data does require access authorization, then in step 804, access information is requested. If the server must provide access information, the server could send its authorization information (e.g., a password) to the database manager who controls access to the data or page. The database manager would then compare, in step 806, the access information with an access list or, in the case of user authorization, a user profile list.

A determination is then made, in step 808, whether or not the server (or user) is authorized to access the data based on the comparison made in step 806. If so, then it is determined that access is approved in step 810 and the procedure ends. If not, then it is determined that access is denied in step 812 and the procedure ends.

Referring back to FIG. 7, if, in step 708, it is determined that access is denied (either to the user or to the server), then server-side computer sends an access denied message to the client computer in step 710 and the program iterates as shown in FIG. 7.

If, in step 708, server-side computer determines that access authorization is not necessary or that access is allowed, then server-side computer retrieves the requested page and/or data in step 714. In step 716, once the Web page and/or data is retrieved, server-side computer sends the page and/or data (either in encrypted or unencrypted form) to the client-side computer. The program then iterates as shown in FIG. 7.

Figure 9:
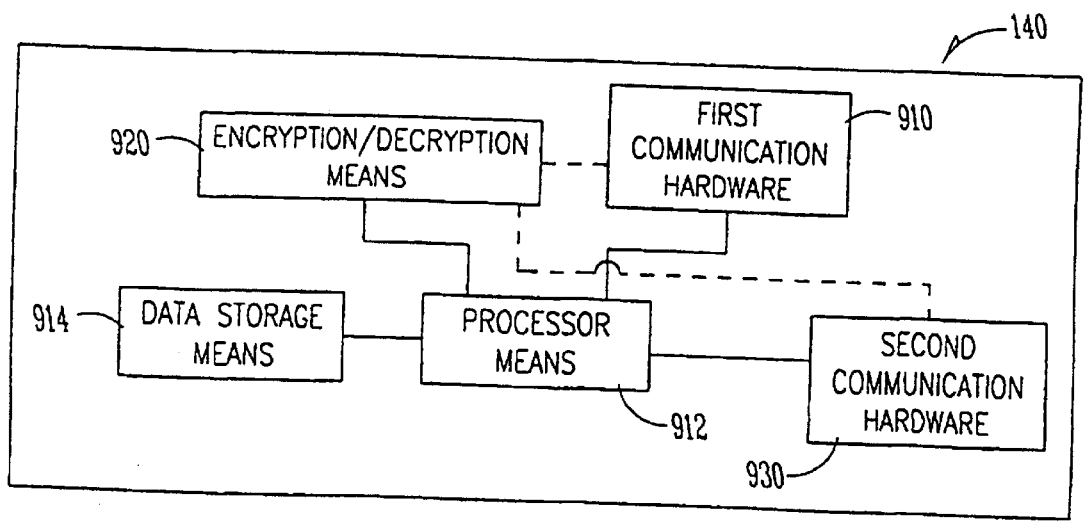
FIG. 9 illustrates a simplified hardware block diagram of a server-side computer in accordance with a preferred embodiment of the present invention.

FIG. 9 illustrates a simplified hardware block diagram of a server-side computer 140 in accordance with a preferred embodiment of the present invention. Server-side computer 140 computer could be, for example, a SUN workstation or another desktop or laptop personal computer. In a preferred embodiment, server-side computer 140 includes first communication hardware 910, processor means 912, and data storage means 914. In addition, computer 140 includes encryption/decryption means 920 and second communication hardware 930, although these two elements are not essential to achieve many of the advantages of the present invention.

Processor means 912 could be, for example, an Intel Pentium processor or other processor suitable for performing the processing functions of server-side computer 140. These processing functions are described in detail in conjunction with FIG. 7, but include, for example, receiving and storing Web pages (steps 702, 704), processing client requests (step 706), determining access rights (step 708), and retrieving and sending pages and data (step 716).

Data storage means 914 is coupled to processor means 912, either directly or through various hardware and interfaces. Data storage means 914 is used to store Web pages, either encrypted or unencrypted, messages, and databases. Often, however, databases are stored remotely and are accessible to a server via a database manager. Data storage means 914 could include any type of read only memory (ROM) and/or random access memory (RAM), and could be in the form of magnetic or optical storage medium, such as, for example, hard drives, compact disks, or magnetic disks. For ease of illustration, only one data storage means 914 is shown. It would be obvious to one of skill in the art, however, that several types of storage may be desirable in order to carry out the method of the present invention.

In a preferred embodiment, encryption/decryption means 920 is coupled to processor means 912, either directly or through various hardware and interfaces. In an alternate embodiment, encryption/decryption means 920 is coupled to first communication hardware 910 and/or second communication hardware 930. Encryption/decryption means 920is used in a preferred embodiment to encrypt messages, data, Web pages, and/or other information prior to transmission via first or second communication hardware 910, 930. Encryption/decryption means 920 also is used in a preferred embodiment to decrypt messages and/or other information received via first or second communication hardware 922, 924. Encryption/decryption means 920 could use, for example, nearly any approved encryption algorithm, including public key/private key algorithms, scrambling, or another proprietary algorithm. Encryption/decryption means 920 is not essential to the method and apparatus of the present invention, but it provides an enhanced measure of information security.

In a preferred embodiment, first communication hardware 910 and second communication hardware 930 are coupled to processor means 912 and/or encryption/decryption means 920, either directly or through various hardware and interfaces. First communication hardware 910 could be, for example, a modem used to modulate or demodulate information transmitted or received, respectively, over an external link with a computer such as Web page development computer 110 (FIG. 1). Second communication hardware 930 also could be, for example, a modem used to modulate or demodulate information transmitted or received, respectively, over an external link with a computer such as client-side computer 170 (FIG. 1). Such information could be transmitted or received in encrypted or unencrypted form. Communication hardware 910, 930 alternatively could be network cards, USBs, or other communication devices. In an alternate embodiment, computer 140 could include only a single communication hardware device which communicates with both Web page development computers and client-side computers. In still another alternate embodiment, computer 140 could include a bank of communication hardware and/or modems for communicating with multiple other computers.

Although only one processor means 912, data storage means 914, and first and second communication hardware 910, 930 are shown, any number of processors, data storage devices, and communication hardware could be used in conjunction with server-side computer 140.

Figure 10:
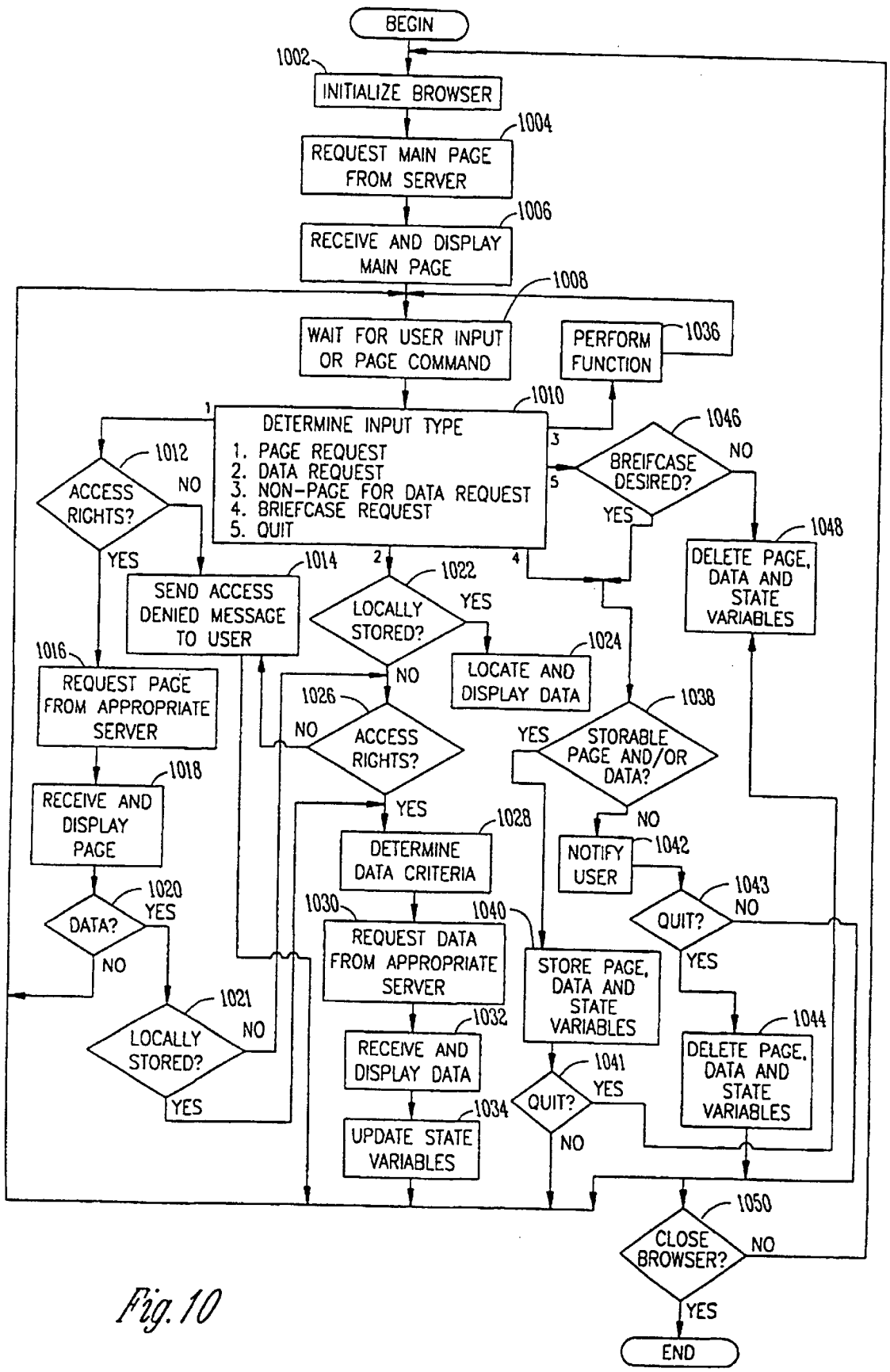
FIG. 10 illustrates a flowchart of a method for requesting, receiving, and displaying a Web page and/or data in accordance with a preferred embodiment of the present invention.

FIG. 10 illustrates a flowchart of a method for requesting, receiving, and displaying a Web page in accordance with a preferred embodiment of the present invention. In a preferred embodiment, the method is performed on a computer such as client-side computer 170 (FIG. 1).

The method begins, in step 1002, when an initialize browser command is received from a user of client-side computer 170. The initialize browser command indicates that the user wants to open the browser associated with the method and apparatus of the present invention.

In step 1004, the browser is initialized and it creates and sends a request for the main Web page associated with the browser. In a preferred embodiment, the request is encrypted, although this is not essential for the method and apparatus of the present invention. The browser then waits to receive the main page from the server. If it is not received within a certain timeout period, the browser can display a timeout message to the user and can terminate.

When the main page is received, in step 1006, the page is decrypted, if necessary, and displayed on the user monitor. After the Web page is displayed, the client-side computer maintains the display until user input or a page command is received, in step 1008. User input could take the form of input from a keyboard, a mouse click, or an audio command, for example. A page command would be a command from an active Web page to perform some function.

Once user input or a page command is received, a determination is made, in step 1010, what type of input has been received. In a preferred embodiment, the following types of user inputs and page commands are possible: 1) a page has been requested; or 2) data has been requested; or 3) some non-page/non-data request has been made; or 4) the user has requested that a page/data be briefcased; or 5) the user wishes to quit. Each of the user inputs and page commands is described below. For ease of illustration, the flowchart includes steps and decisions only relevant to receiving, displaying, and storing a Web page and/or data. It does not contemplate all possible user inputs and page commands. In alternate embodiments, additional or different user inputs and page commands are possible.

1. Page Request

If, in step 1010, it is determined that the user has requested a Web page, then a determination is made, in step 1012, whether the user has access rights. The access rights determination is made, in a preferred embodiment, by the Web page from which the user requested access to a new page. In other words, the Web page includes code that enables it to determine whether or not the user is authorized to access the requested Web page. Checking user access privileges could, for example, require the user to input a password or some other information, and the password could be checked with information stored within the page document. Such an access determination could be made by an algorithm similar to that described in detail in conjunction with FIG. 8, for example, except that all steps would be performed on the client-side computer. In alternate embodiments, access rights could be determined through some other method.

If a determination is made, in step 1012, that access is denied, then an access denied message is sent to the user in step 1014 (e.g., by displaying the message on the monitor). If access is approved, then the Web page formulates the page request and sends it to the appropriate server in step 1016. The appropriate server could be a remote server or, in some cases, could be a local server.

Once the page is received, the client computer decrypts the page, if necessary, and displays the Web page on the monitor in step 1018. The Web page then becomes "active," and certain portions of component code could execute. If the Web page includes data components, then the page could request the first set of data to be displayed within those data components. If, as indicated in step 1020, the Web page does not include data components, then the method returns to step 1008 to wait for additional user input. If the Web page does include data components, then the method determines, in step 1021, whether that data is locally stored. If not, then the method executes steps 1026–1034 which are necessary for the Web page to request the appropriate data. If, in step 1021, the method determines that the data is locally stored, then the method executes steps 1028–1034. In such a case, the appropriate server in step 1030 would be the local server, rather than a remote server. Steps 1026–1034 are discussed in detail below.

In certain instances, a page could be requested without performing steps 1002–1010. For example, a user could invoke a Web page created in accordance with a preferred embodiment by typing the page's URL into a browser. Such browser could be the browser in accordance with the present invention, or could be a prior art browser. If a page is accessed directly, it may be necessary for the server to perform access authorization, since the page was not invoked by another page having knowledge of user access rights. Alternatively, the page could perform access authorization upon being downloaded to the client computer.

2. Data Request

If, in step 1010, it is determined that the user has requested data, then a determination is made, in step 1022, whether the data is stored locally. The data may be stored locally, for example, if the data had been previously obtained from the server and stored on the client machine. For example, the user may have downloaded several sets of data during an interaction with a particular page. The user may then want to scroll backwards into data that the user previously downloaded. Alternatively, the user may have briefcased a page and a set of data and may want to view the briefcased data. In any event, if the data is locally stored, then the data is located and displayed, in step 1024, by the client computer.

If the data is not locally stored, then a determination is made, in step 1026, whether the user has access rights. This determination could be made in a manner similar to step 1012, except that the access rights would pertain to access to data, rather than access to a page. If the user does not have access rights, then an access denied message is sent to the user in step 1014 and the procedure iterates as shown.

If the user does have access rights, then the criteria necessary to describe the data are determined in step 1028. Step 1028 could also be invoked, as previously described, when a Web page automatically determines that it needs to request a set of data (step 1020). The data criteria identify the database, table, and record (or records) which the user or Web page would like to view. In a preferred embodiment, the particular record to be viewed is identified by evaluating state variables stored by the Web page. These state variables indicate which records the page has already accessed, and which records would be next.

Storage of state variables by the Web page represents a significant advantage to the method of the present invention. Such storage eliminates the need to have intelligence at the server to maintain state information (e.g., "agents"), and also eliminates the need to maintain a persistent connection with the server during the entire database access session. Thus, maintenance of state variables at the Web page results in reduced server complication and also in lower bandwidth demands, among other advantages.

After the data criteria are determined, in step 1028, then a data request is formulated and the request is sent to the appropriate server in step 1030. The appropriate server could be a remote server or, in some cases, could be a local server. In a preferred embodiment, the request is encrypted before it is sent, although this is not essential. The requested data is received, in step 1032, and displayed within the appropriate data component (or components). In step 1034, the state variables associated with the data are updated to reflect the fact that the user has advanced further within the database (or to different records within the database). The method then returns to step 1008 to wait for additional user input.

3. Non-page/Non-data Request

If, in step 1010, it is determined that the user (or a Web page) has made a request that is not a page or data request, then the client computer performs the function associated with the request, in step 1036, and the method returns to step 1008 to wait for additional user input. Non-page and non-data requests could include, for example, a request to use a hyperlink to another Web site, a request to run an audio or video file, a request to send an email, or many other types of requests.

4. Briefcase Request

If, in step 1010, it is determined that the user has requested that a page and/or data be briefcased, then a determination is made, in step 1038, whether the page and/or data is storable. In a preferred embodiment, this determination is made by the Web page through execution of code that a developer included within the Web page (as discussed in conjunction with FIG. 3, step 342). The determination of whether a page and/or data is storable also could include an access rights determination.

If it is determined that the page and/or data is storable, then the page document, data which has been downloaded in conjunction with the page, and the current state variables are stored on the client computer in step 1040. Storage of the state variables is desired so that, when a user decides to re-invoke the page, the user can begin accessing data where the user previously left off. If step 1041 indicates that the developer wanted to quit, then the method branches to step 1050. If, in step 1050, a determination is made that the developer wants to close the browser, then the browser is closed and the method ends. Otherwise, the method branches to step 1002. If step 1041 indicates that the developer did not want to quit, the method then returns to step 1008 to wait for additional user input.

If, in step 1038, it is determined that the page and/or data is not storable, then the user is so notified, in step 1042. If step 1043 indicates that the developer wanted to quit, then the page document, data, and state variables are deleted in step 1044. The method then returns to step 1008 to wait for additional user input. If step 1043 indicates that the developer did not want to quit, then the method returns to step 1008 to wait for additional user input.

5. Quit

If, in step 1010, it is determined that the user would like to quit, then, in a preferred embodiment, the user is asked whether he would like to briefcase the page and/or data. If the user indicates that he would like to briefcase the page and/or data, then steps 1038–1044 are performed. If the user indicates that he would not like to briefcase the page and/or data, then the page document, data, and state variables are deleted, in step 1048, and a determination is made, in step 1050, whether the developer wants to close the browser. If so, the browser is closed and the method then ends. If not, then the method branches to step 1002 and continues.

One advantage to the present invention is that the browser associated with the Web pages of the preferred embodiment can be much smaller than prior-art Web pages. One reason for this is that each Web page developed in accordance with the present invention is capable of communicating directly with remote servers. Prior art Web pages rely on prior art browsers to relay messages back and forth from the server. The Web pages of the present invention do not. Therefore, it is possible to close the browser of the present invention during an interactive session between a Web page and a server. In fact, a Web page created in accordance with the present invention could request that the browser be closed upon invocation of the page.

Figure 11:
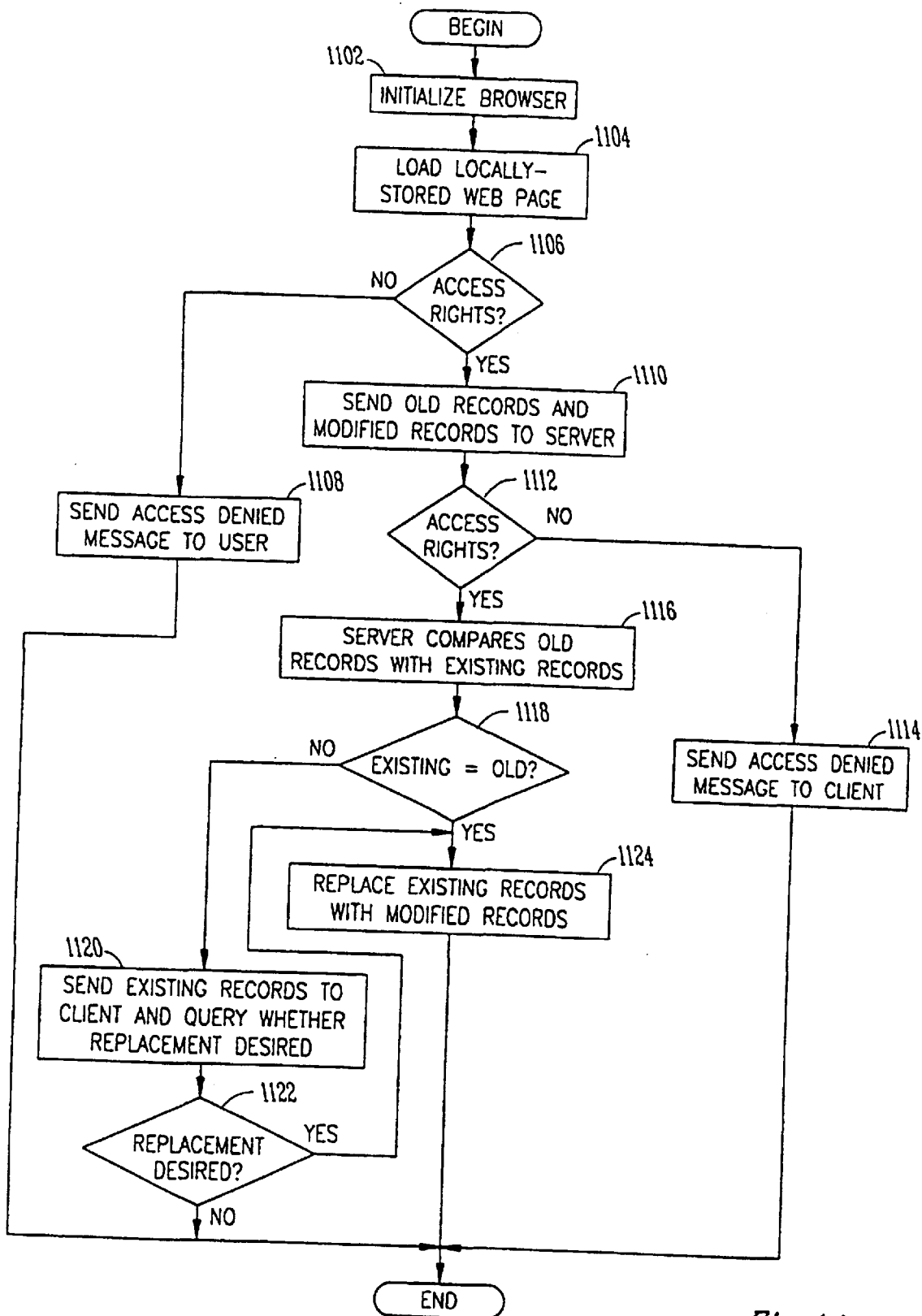
FIG. 11 illustrates a flowchart of a method for posting modified data to a remote database in accordance with a preferred embodiment of the present invention.

If a Web page and/or data has been briefcased and edited by a user offline, the user may later want to post his data changes to the database. FIG. 11 illustrates a flowchart of a method for posting modified data to a remote database in accordance with a preferred embodiment of the present invention.

The method begins, in step 1102, when the user initializes the browser. Browser initialization was discussed in more detail in conjunction with FIG. 10, step 1002. Once the browser is initialized, then the user can cause the locally-stored Web page and data to be loaded and displayed in step 1104. At this stage, the user could perform additional edits, if desired.

Once the user has made his changes to the data, then he informs the page to connect to the server and post the changes. In a preferred embodiment, the page determines whether the user has access rights to make such changes to the database in step 1106. Access rights determination could be made, for example, in a manner similar to FIG. 10, step 1026. During development of the page, the developer could incorporate code into the Web page which indicates who has data modification privileges, as discussed previously in conjunction with FIG. 3, step 342. If the user does not have access rights, then an access denied message is sent to the user in step 1108 and the procedure ends.

If the user does have access rights, then the page, in step 1110, formulates a message which identifies the database and table, and which also includes the old data records (i.e., the data which was originally downloaded from the server) and the modified data records. The server then determines, in step 1112, whether the server has access rights to modify the data within the database. If not, then the server sends an access denied message to the client computer, in step 1114, and the procedure ends.

If the server does have access rights, then, in step 1116, the server compares the old records received from the client computer with the records currently existing in the database. A determination is made, in step 1118, whether the old records and existing records match. If they do not match, it indicates that the database has been modified by another user since the current user downloaded the data. In such a case, the server sends the existing records back to the client computer, in step 1120, so that the client computer can query the user as to whether he actually wants to modify the database. If the user indicates, in step 1122, that the replacement is not desired, then the procedure ends.

If the user indicates that replacement is desired, or if the old and existing records match, then the existing records are replaced with the modified records in step 1124, and the procedure ends. Some of steps 1112–1124 may require the server to interact with a database manager associated with the database.

Figure 12:
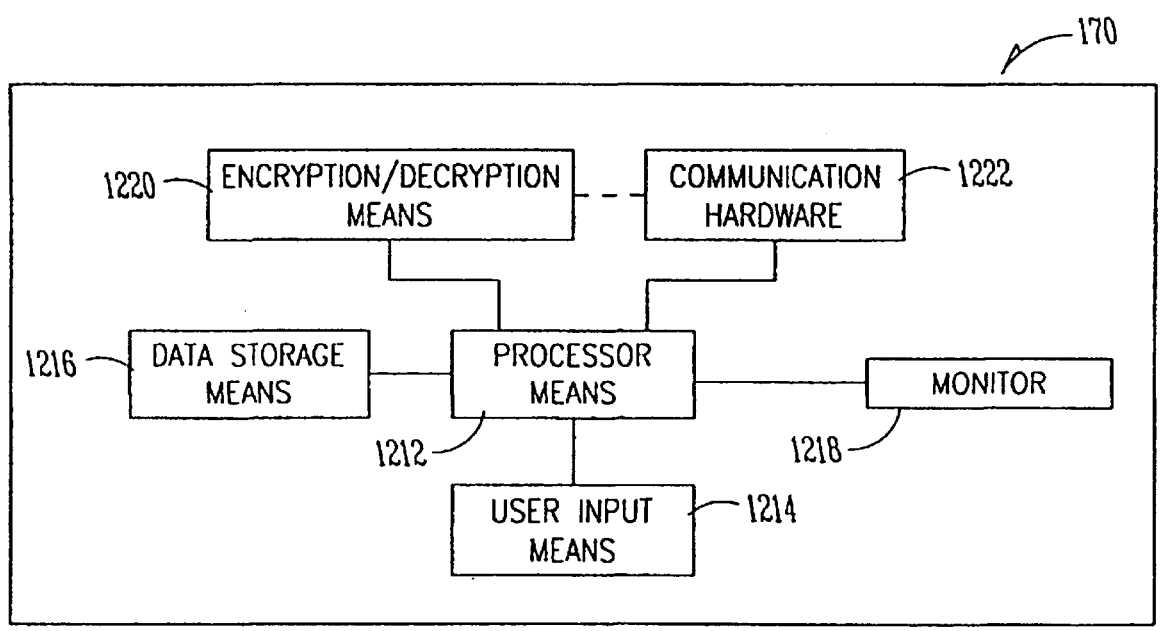
FIG. 12 illustrates a simplified hardware block diagram of a client-side computer in accordance with a preferred embodiment of the present invention.

FIG. 12 illustrates a simplified hardware block diagram of a client-side computer 170 in accordance with a preferred embodiment of the present invention. Client-side computer 170 could be, for example, a SUN workstation or another desktop or laptop personal computer. In a preferred embodiment, client-side computer 170 includes processor means 1212, user input means 1214, data storage means 1216, communication hardware 1222, and monitor 1218. In addition, computer 170 includes encryption/decryption means 1220, although this element is not essential to achieve many of the advantages of the present invention.

Processor means 1212 could be, for example, an Intel Pentium processor or other processor suitable for performing the processing functions of client-side computer 170. These processing functions are described in detail in conjunction with FIG. 10, but include, for example, initializing the browser (step 1002, FIG. 10), requesting the main page (step 1004, FIG. 10), requesting additional pages (steps 1012–1020, FIG. 10), requesting data (steps 1022–1034, FIG. 10), and briefcasing pages and data (steps 1038–1044, FIG. 10).

User input means 1214 is coupled to processor means 1212, either directly or through various hardware and interfaces. User input means 1214 could be, for example, a keyboard, mouse, microphone, digital video device, or any combination thereof. User input means 1214 is the way in which a user gives commands to the browser.

Data storage means 1216 is coupled to processor means 1212, either directly or through various hardware and interfaces. Data storage means 1216 is used to store the browser, page documents, data from remote databases, and other data items. Data storage means 1216 could include any type of read only memory (ROM) and/or random access memory (RAM), and could be in the form of magnetic or optical storage medium, such as, for example, hard drives, compact disks, and magnetic disks. For ease of illustration, only one data storage means 1216 is shown. It would be obvious to one of skill in the art, however, that several types of storage would be desirable in order to carry out the method of the present invention.

Monitor 1218 is coupled to processor means 1212, either directly or through various hardware and interfaces. Monitor 1218 is used to display Web pages to the user.

In a preferred embodiment, encryption/decryption means 1220 is coupled to processor means 1212, either directly or through various hardware and interfaces. In an alternate embodiment, encryption/decryption means 1220 is coupled to communication hardware 1222. Encryption/decryption means 1220 is used in a preferred embodiment to encrypt messages, requests, and/or other information prior to transmission via communication hardware 1222. Encryption/decryption means 1220 also is used in a preferred embodiment to decrypt messages, Web pages, and/or other information received via communication hardware 1222. Encryption/decryption means 1220 could use, for example, nearly any approved encryption algorithm, including public key/private key algorithms, scrambling, or another proprietary algorithm. Encryption means 1220 is not essential to the method and apparatus of the present invention, but it provides an enhanced measure of information security.

In a preferred embodiment, communication hardware 1222 is coupled to processor means 1212 and/or encryption/decryption means 1220, either directly or through various hardware and interfaces. Communication hardware 1222 could be, for example, a modem used to modulate or demodulate information transmitted or received, respectively, over an external link. Such information could be in encrypted or unencrypted form. Alternatively, communication hardware 1222 could be a network card, USB, or other communication device.

Although only one processor means 1212, user input means 1214, and data storage means 1216 are shown, any number of processors, user input devices, and data storage devices could be used in conjunction with client-side computer 170.

As previously described, the method and apparatus of the present invention provide the advantage of enabling a user to browse data on a first open page while the data on a second open page is automatically updated. Creation of pages having linked components from the developer perspective was described in detail in conjunction with FIG. 3, steps 330–336. Data linking is now described from the client-side computer perspective.

As described previously, multi-page data linking refers to the linking of various data sets across multiple Web pages. For example, in a preferred embodiment, a first Web page may include a component containing data through which the user can scroll. The user may then open a second Web page which contains a component containing data which is related to, but different from, the data displayed by the first page. In a preferred embodiment, these two pages are linked in such a way that, when the user opens the second page, the data displayed therein will correspond to the data displayed in the first page. In addition, when the user scrolls through the data on either page, the other page will automatically update itself to display the corresponding data.

An example will better illustrate the preferred embodiment. Assume that a first Web page permits access to certain employee information which is stored in an employee information database accessible to a server. In the present example, the database could be a relational database, where unique employee numbers are the keys used to link records of the various tables together. The database could include the employee number and multiple types of information such as:

a) job-related information, including supervisor name, secretary name, office location, work phone and fax numbers, and job title;

b) personnel-related information, including salary, job grade level, performance data, and hire date;

c) personal information, including name, home address and telephone number, marital status, gender, and age.

Assume that a first Web page includes a component for displaying the employee name, along with the first type of employee information, namely job-related information. After the Web page user selects a particular employee name, the user's client-side computer would send a request to the appropriate server for the job-related information for that employee. The server-side computer would retrieve that information from the employee information database and send the information back to the client-side computer. In a preferred embodiment, the client-side computer would then display the information in the first Web page's data component or components corresponding to the information, and would update the state variables which identify what record of the database the user has accessed.

Assume further that the user has an option (and access privileges) to open a second, related Web page which includes a component for displaying the employee's personnel-related information. In a preferred embodiment of the present invention, the client-side computer would send a request to the server for the same employee's personnel-related information without requiring the user to input the employee name again. The server would access and send the appropriate personnel-related information, which would be displayed on the second page.

If the user kept both pages open and, on the first page, entered another employee's name, then the method of the present invention would cause the data on both the first and second Web pages to be updated automatically to reflect the job-related and personnel-related information for the second employee. In this manner, the data between the two Web pages is linked. When the data is updated on the first page, the related data is also updated on the second page.

Figure 13:
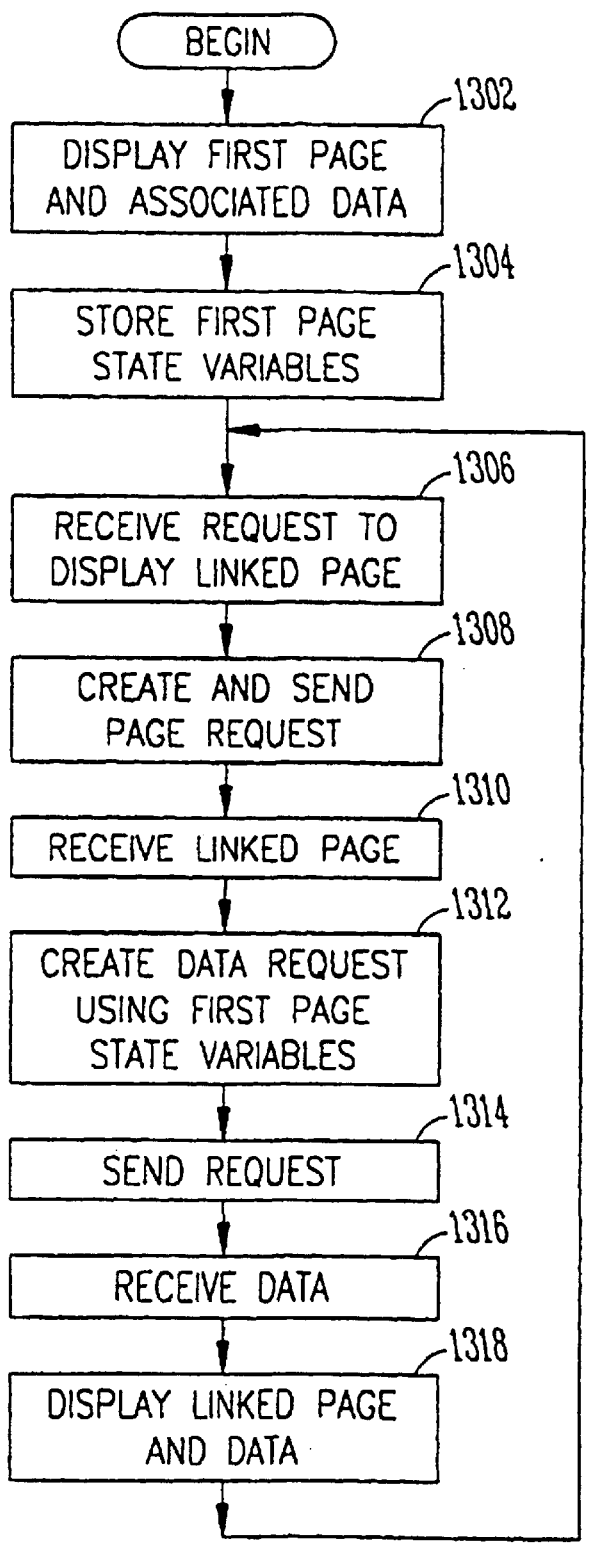
FIG. 13 illustrates a flowchart of a method for multi-page data linking in accordance with a preferred embodiment of the present invention.

FIG. 13 illustrates a flowchart of a method for multi-page data linking in accordance with a preferred embodiment of the present invention. In a preferred embodiment, the method is performed on a computer such as client-side computer 170, FIG. 1. The method begins, in step 1302, by displaying a first page and an associated first data set. For ease of illustration, the first page will be considered the Master page, as that term has been previously defined.

Step 1302 presumes that no access restrictions exist or the user has access approval to display the first page and/or first data set. In step 1304, state variables identifying the first data set are stored. In the example described above, the first data set could include an employee's job-related information.

In step 1306, a user request is received to display a second page having a second set of related data. For ease of illustration, the second page will be considered the Detail page, as that term has been previously defined. In the example described above, the second data set could include an employee's personnel-related or personal information. The second page is received, in step 1310, and after it becomes active, the state variables associated with the first page are used to formulate a request for the second-page data in step 1312.

The second-page data request is sent to the server, in step 1314, and the second-page data is received, in step 1316. If the second page includes data components which are unrelated to the first-page data, then state variables for those new data components may also need to be initialized. In step 1318, the second page and second-page data is displayed by the client-side computer. In an alternate embodiment, the second page could be displayed prior to step 1318.

If the user requests another page with related data (e.g., a page which displays the employee's personal information), steps 1306–1318 are repeated. If the user requests additional data on any one of the pages (e.g., data for another employee), then the related state variables are used to formulate the data request for each page having related data and, once the data is received from the server, the corresponding data components for each page are updated.

In some cases, a particular Web page in accordance with the present invention may have requested and stored multiple data records (e.g., information for multiple employees), even though the page displays information contained in only one or a few such records. Upon opening a second page, the related data for the multiple data records could be requested from the server and stored, and the second page also could display information contained in only one or a few such records.

If the user wants to scroll through the locally-stored data, it would not be necessary to request the data from the server (steps 1312–1316). Instead, the client-side computer would access and display the previously-stored data for each of the pages. Server requests for data are necessary only when a Web page (or pages) want access to data which they have not downloaded and maintained. In addition, state variables need to be updated only when new sets of data are received from the server.

Figure 14:
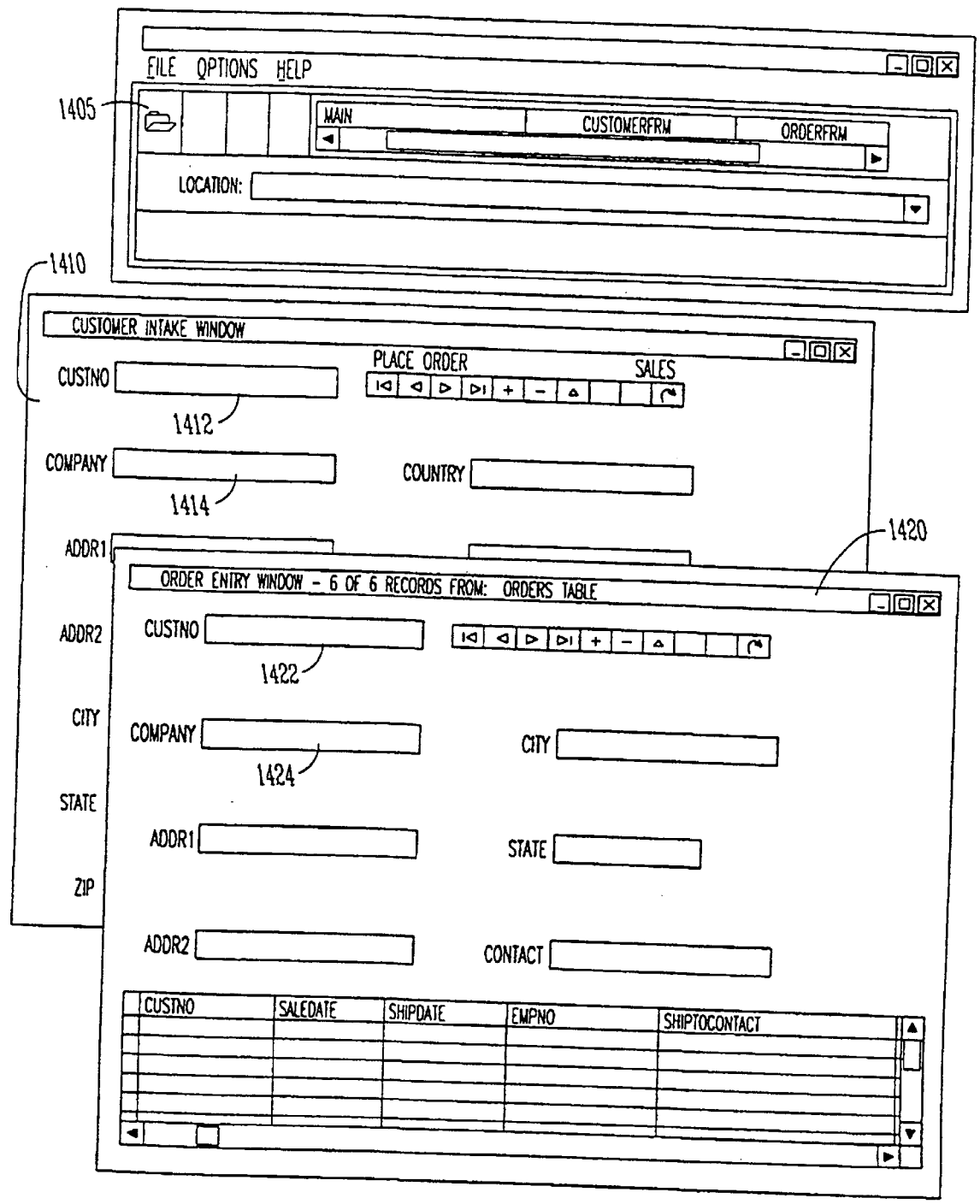
FIG. 14 illustrates an exemplary linked Web page display in accordance with a preferred embodiment of the present invention.

FIG. 14 illustrates an exemplary linked Web page display in accordance with a preferred embodiment of the present invention. A browser display 1405 is associated with a browser which is initially used to gain access to a server-side computer and to display an initial Web page. In accordance with the present invention, the browser may thereafter be closed, at the user's option, as the browser is not essential for a user to interact with Web pages which were designed in accordance with the present invention. A first page 1410 and a second page 1420 each display particular items of related data. In the example shown, first page 1410 displays data for customer number 1412, company 1414, and other information for that particular customer number. Second page 1420 also displays customer number 1422 and company 1424, but also displays different, but related information, specifically the history of customer sales 1426.

In a preferred embodiment, at the time that the user opened second page 1420, the method of the present invention used the state variables identifying the first page data to formulate a request for the customer sales data 1426. Also in a preferred embodiment, if the user changed the customer number 1412 or 1422 in either first page 1410 or second page 1420, the method of the present invention would update the company data 1414, 1424, customer sales 1426, and other related data displayed by both pages 1410 and 1420.

FIG. 15 illustrates a flowchart of a method for scrolling through data in association with linked pages in accordance with a preferred embodiment of the present invention. In a preferred embodiment, the method is performed on a computer such as client-side computer 170, FIG. 1.

When the method begins, it is assumed that multiple linked data pages have already been downloaded in accordance with the method described in FIG. 13. Therefore, upon initiation of the method of FIG. 15, it is further assumed that multiple linked pages, which include linked data components, are currently being displayed, and the state variables for those pages have been stored by the Web pages.

In step 1502, one of the linked pages receives user input indicating that the user would like to display a different set of data within one or more components on that page. Upon receiving this request, a determination is made, in step 1504, whether the requested data is currently stored on the client machine. For example, a client machine may have received and stored only the first twenty records of employee personal data in response to one or more previous requests to the server. In a preferred embodiment, those twenty records would be stored on the client machine and the user would be able to scroll through them without initiating another request to the server. Following the same example, if the user attempts to scroll to the twenty-first record, the Web document would need to formulate another request for data and send that request to the server in a preferred embodiment. While scrolling through the first twenty records, step 1504 would determine that the data is stored locally. If a request for data other than that which is contained within the first twenty records is received, step 1504 would determine that the data is not stored locally. If step 1504 determines that the data is stored locally, then the data is retrieved and displayed in step 1506.

If step 1504 determines that the data is not stored locally, then a determination is made, in step 1508, whether the data is being scrolled in a linked page component. If the data is being scrolled in a linked page component, then, in step 1510, the first page sends a request to the linked page which obtains data from the server for the first page, where the request indicates which data the first page would like to view.

If the first page is capable of creating and sending its own data requests to the server, or after the request is received by the linked page from the first page, then, in step 1512, the client machine creates a request for the data displayed by both the first and linked pages using the state variables. The client machine then sends the request to the server in step 1514. Upon receipt of the data from the server in step 1516, the page which requested the data from the server sends the data to the page which displays that data, and that page displays the data in step 1518. The state variables affected by the new data are then updated in step 1520, and the procedure iterates as shown.

Thus, a method and apparatus for developing, deploying, downloading, and executing Web pages has been described which overcomes specific problems, and accomplishes certain advantages relative to prior art methods and mechanisms. One advantage to the method and apparatus of the present invention is that, during database applications, they do not require an entire page to be dynamically generated at the server each time a user requests a new set of data. Instead, in accordance with the present invention, the server only sends the new piece of data and the Web page updates the appropriate field An additional advantage is that the method and apparatus of the present invention enable state management to be performed by the client-side computer by utilizing code embedded within a Web page. This state management capability also enables the method and apparatus of the present invention to provide Web page briefcasing, an additional advantage of the present invention. In addition, the embedded Web page code of the method and apparatus of the present invention greatly reduce security risks associated with prior-art downloaded executables which could contain malicious code. Another advantage of the present invention is that it enables a Web-page users to view and interact with multiple linked pages simultaneously, without launching another instance of the Web browser.

The foregoing descriptions of the specific embodiments will so fully reveal the general nature of the invention that others can, by applying current knowledge, readily modify and/or adapt the embodiments for various applications without departing from the generic concept. Therefore, such adaptations and modifications should, and are intended to be comprehended within the meaning and range of equivalents of the disclosed embodiments. In particular, while a preferred embodiment has been described in terms of a system in which the client-side computer and the page development computer communicate with a server-side computer over the Internet, those of skill in the art will understand, based on the description herein, that the method and apparatus of the present invention also could be used in a system in which either or both the client-side and development computers communicate with the server-side computer over a LAN, WAN, or other network or link. Moreover, those skilled in the art will appreciate that the flowcharts presented herein are intended to teach the present invention and that different techniques for implementing program flow that do not necessarily lend themselves to flowcharting may be devised. For example, each task discussed herein may be interrupted to permit program flow to perform background or other tasks. In addition, the specific order of tasks may be changed, and the specific techniques used to implement the tasks may differ from system to system.

It is to be understood that the phraseology or terminology employed herein is for the purpose of description, and not of limitation. Accordingly, the invention is intended to embrace all such alternatives, modifications, equivalents, and variations as fall within the spirit and broad scope of the appended claims.

What is claimed is:

1. A system for Web page development, deployment, download, and execution comprising:

a Web page development computer having a first processor means, a first monitor, a first data storage means, a first user input mean and a first communication means, wherein the first processor means initializes a page development tool with which a human developer, using the first user input means, creates a Web page document by placing a component on a Web page displayed on the first monitor, upon which the page development tool retrieves event-driven code corresponding to the component from the first data storage means, the event-driven code being executed by the client-side computer which will display the Web page, and the event-driven code being capable of requesting access to and manipulation of data in a database, and the page development tool also gathers database information if the component is a database-related component, creates linking code if the human developer indicates that the database-related component should be linked to a second database-related component on a second Web page, and places the event-driven code, database information, and linking code in the Web page document, and when the human developer indicates that the Web page defined by the Web page document should be deployed, the Web page development computer, via the first communication means, sends the Web page document to a server-side computer over a first network;

the server-side computer having at least one communication means, a second processor means, and a second data storage means, wherein the Web page document is received off the first network via the at least one communication means and is stored in the second data storage means, and, when a client-side computer requests the Web page document, the server-side computer retrieves the Web page document from the second data storage means and sends, via the at least one communication means, a Web page document to the client-side computer over a second network which could be the first network, and, when the Web page on the client-side computer requests data from a database, the server-side computer retrieves and sends the data, via the at least one communication means, to the client-side computer; and the client-side computer having a third processor means, a second monitor, a third data storage means, a second user input means, and a second communication means, wherein the third processor means initializes a browser which requests, via the second communication means, the Web page document from the server side computer, and, after the second communication means receives the Web page document, the third processor means enables the Web page corresponding to the Web page document to be displayed via the second monitor, and, if the Web page includes the database-related component, the processor executes the code corresponding to the database-related component, causing the client-side computer to send a data request, via the third communication means, to the server-side computer over the second network, and, after receiving data corresponding to the request the processor causes the data to be displayed within the database-related component on the Web page and stores state variables, for use if additional data is requested, which indicate which data has been displayed, and, if the database-related component is linked to the second database-related component, the third processor executes the linking code, and, if the human user requests that the Web page document be stored locally on the client-side computer, the third processor causes the Web page document, the data and the additional data, and the state variables to be stored in the third data storage means so that the human user can modify the data and the additional data offline, reconnect to the server-side computer at a later time, and download modified data to the server-side computer which would then modify the database using the modified data.

* * * * *